United States Patent
Yip et al.

(10) Patent No.: US 11,722,847 B2
(45) Date of Patent: Aug. 8, 2023

(54) METHOD AND APPARATUS FOR AUGMENTED REALITY SERVICE IN WIRELESS COMMUNICATION SYSTEM

(71) Applicant: Samsung Electronics Co., Ltd., Suwon-si (KR)

(72) Inventors: Eric Yip, Suwon-si (KR); Hyunkoo Yang, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 17/401,921

(22) Filed: Aug. 13, 2021

(65) Prior Publication Data

US 2022/0053291 A1    Feb. 17, 2022

(30) Foreign Application Priority Data

Aug. 14, 2020    (KR) .......................... 10-2020-0102718

(51) Int. Cl.
*H04W 4/029* (2018.01)
*G06T 15/20* (2011.01)
*H04W 4/02* (2018.01)

(52) U.S. Cl.
CPC .............. *H04W 4/029* (2018.02); *G06T 15/20* (2013.01); *H04W 4/023* (2013.01); *G06T 2210/36* (2013.01)

(58) Field of Classification Search
CPC ........ G06T 15/20; H04W 4/029; H04W 4/023
USPC ........................................................ 345/419
See application file for complete search history.

(56) References Cited

U.S. PATENT DOCUMENTS

| | | |
|---|---|---|
| 10,612,908 B2 | 4/2020 | Dryer et al. |
| 11,163,417 B2 | 11/2021 | Hauenstein et al. |
| 2012/0124086 A1 | 5/2012 | Song et al. |
| 2017/0262704 A1 | 9/2017 | Wnuk et al. |
| 2018/0349700 A1 | 12/2018 | Percuoco et al. |
| 2019/0088030 A1* | 3/2019 | Masterson ............... G01S 19/01 |
| 2020/0364937 A1* | 11/2020 | Selbrede ................ G06F 9/455 |

FOREIGN PATENT DOCUMENTS

| | | |
|---|---|---|
| KR | 10-2020-0031666 A | 3/2020 |
| WO | 2012/135546 A1 | 10/2012 |

OTHER PUBLICATIONS

International Search Report dated Nov. 23, 2021, issued in International Application No. PCT/KR2021/010570.

* cited by examiner

*Primary Examiner* — Thomas J Lett
(74) *Attorney, Agent, or Firm* — Jefferson IP Law, LLP

(57) ABSTRACT

A method performed by a user equipment (UE) in a wireless communication system is provided. The method includes transmitting, to a server, location information of the UE and a message for requesting a parameter related to one or more first anchor trees corresponding to a location of the UE, in response to the message for requesting the parameter, receiving, from the server, the parameter related to the one or more first anchor trees, based on the received parameter and the location information, identifying at least one second anchor tree, on which an AR content is renderable, among the one or more first anchor trees, requesting the server for an AR content corresponding to the identified at least one second anchor tree, receiving the requested AR content from the server, and rendering the received AR content on the at least one second anchor tree.

20 Claims, 14 Drawing Sheets

METHOD AND APPARATUS FOR AUGMENTED REALITY SERVICE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0102718, filed on Aug. 14, 2020, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for providing an augmented reality (AR) service by using anchoring based on a physical location of an existing object.

2. Description of Related Art

To meet the increasing demand with respect to wireless data traffic after the commercialization of $4^{th}$ generation (4G) communication systems, efforts to develop enhanced $5^{th}$ generation (5G) communication systems or pre-5G communication systems are continuing. For this reason, a 5G communication system or pre-5G communication system is called a beyond 4G network communication system or a post long term evolution (LTE) system. A 5G communication system defined in the 3GPP is called a new radio (NR) system.

To achieve a high data rate, the implementation of a 5G communication system in an ultra-high-frequency millimeter wave (mmWave) band (for example, a 60 GHz band) is being considered. In order to reduce the path loss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed, and have been applied to NR systems.

Furthermore, for the improvement of a system network, in the 5G communication system, technologies such as advanced small cells, advanced small cells, a cloud radio access network (cloud RAN), an ultra-dense network, device to device communication (D2D), wireless backhaul, a moving network, cooperative communication, coordinated multi-points (CoMP), reception interference cancellation, and the like, have been developed.

In addition, in the 5G system, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access techniques, are being developed.

The Internet, which is a human-oriented connectivity network where humans generate and consume information, is now evolving into the Internet of things (IoT), where distributed entities, such as objects, exchange and process information. Internet of everything (IoE) technology, in which big data processing technology through a connection to a cloud server and the like is combined with the IoT technology, is also emerging. To implement the IoT, various technical factors, such as sensing technology, wired/wireless communication, network infrastructure, service interface technology, and security technology, are required. Recently, technologies including a sensor network, machine-to-machine (M2M) communication, and machine type communication (MTC) for connections between objects have been studied. In an IoT environment, an intelligent Internet technology (IT) service is provided to collect and analyze data generated by connected objects to create new value for human life. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Accordingly, various attempts to apply a 5G communication system to an IoT network are being made. For example, 5G communication such as sensor networks, M2M communication, and MTC are being implemented by using various schemes such as beamforming, MIMO, and array antennas. Applying a cloud radio access network (CRAN) as big data processing technology is also an example of the convergence of 5G technology and IoT technology.

Meanwhile, there is a need for a new standard for providing an augmented reality (AR) service by using anchoring based on existing physical objects such as buildings.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, the disclosure is to provide a method and apparatus for providing an augmented reality (AR) service based on a physical distance between an anchor tree and a user equipment (UE) and an orientation of the UE with respect to the anchor tree, in a wireless cooperative communication system.

Additional aspects will be set forth in part in the description which follows and, in part, will be apparent from the description, or may be learned by practice of the presented embodiments.

In accordance with an aspect of the disclosure, a method performed by a UE in a wireless communication system is provided. The method includes transmitting, to a server, location information of the UE and a message for requesting a parameter related to one or more first anchor trees corresponding to a location of the UE, in response to the message for requesting the parameter, receiving, from the server, the parameter related to the one or more first anchor trees, based on the received parameter and the location information, identifying at least one second anchor tree, on which an AR content is renderable, among the one or more first anchor trees, requesting the server for an AR content corresponding to the identified at least one second anchor tree, receiving the requested AR content from the server, and rendering the received AR content on the at least one second anchor tree.

In accordance with another aspect of the disclosure, a method performed by a UE in a wireless communication system is provided. The method includes transmitting, to a server, location information of the UE and a message for requesting a parameter for identifying anchor trees for AR rendering, in response to the message for requesting the parameter, receiving, from the server, the parameter for identifying the anchor trees for the AR rendering, identifying at least one second anchor tree, on which an AR content is renderable, among one or more first anchor trees corresponding to the location of the UE, based on the location information of the UE and the received parameter for identifying the anchor trees for the AR rendering, requesting the server for a parameter for identifying an AR content corresponding to the identified at least one second anchor tree, receiving, from the server, the requested parameter for identifying the AR content, requesting the server for the AR content corresponding to the identified at least one second anchor tree based on the received parameter for identifying the AR content, receiving the requested AR content from the server, and rendering the received AR content on the at least one second anchor tree.

In accordance with another aspect of the disclosure, a method performed by a UE in a wireless communication system is provided. The method includes transmitting, to a server, location information of the UE and a media request for AR rendering, in response to the media request, receiving, from the server, AR content that is identified by the server based on the location information of the UE and a parameter for at least one anchor tree associated with a location of the UE, and rendering the received AR content.

In accordance with another aspect of the disclosure, a UE is provided. The UE includes a transceiver, and at least one processor connected to the transceiver. The at least one processor may be configured to transmit, to a server via the transceiver, location information of the UE and a message for requesting a parameter related to one or more first anchor trees corresponding to a location of the UE, in response to the message for requesting the parameter, receive, from the server, the parameter related to the one or more first anchor trees, based on the received parameter and the location information, identify at least one second anchor tree, on which an AR content is renderable, among the one or more first anchor trees, via the transceiver, request the server for an AR content corresponding to the identified at least one second anchor tree, via the transceiver, receive the requested AR content from the server, and render the received AR content on the at least one second anchor tree.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
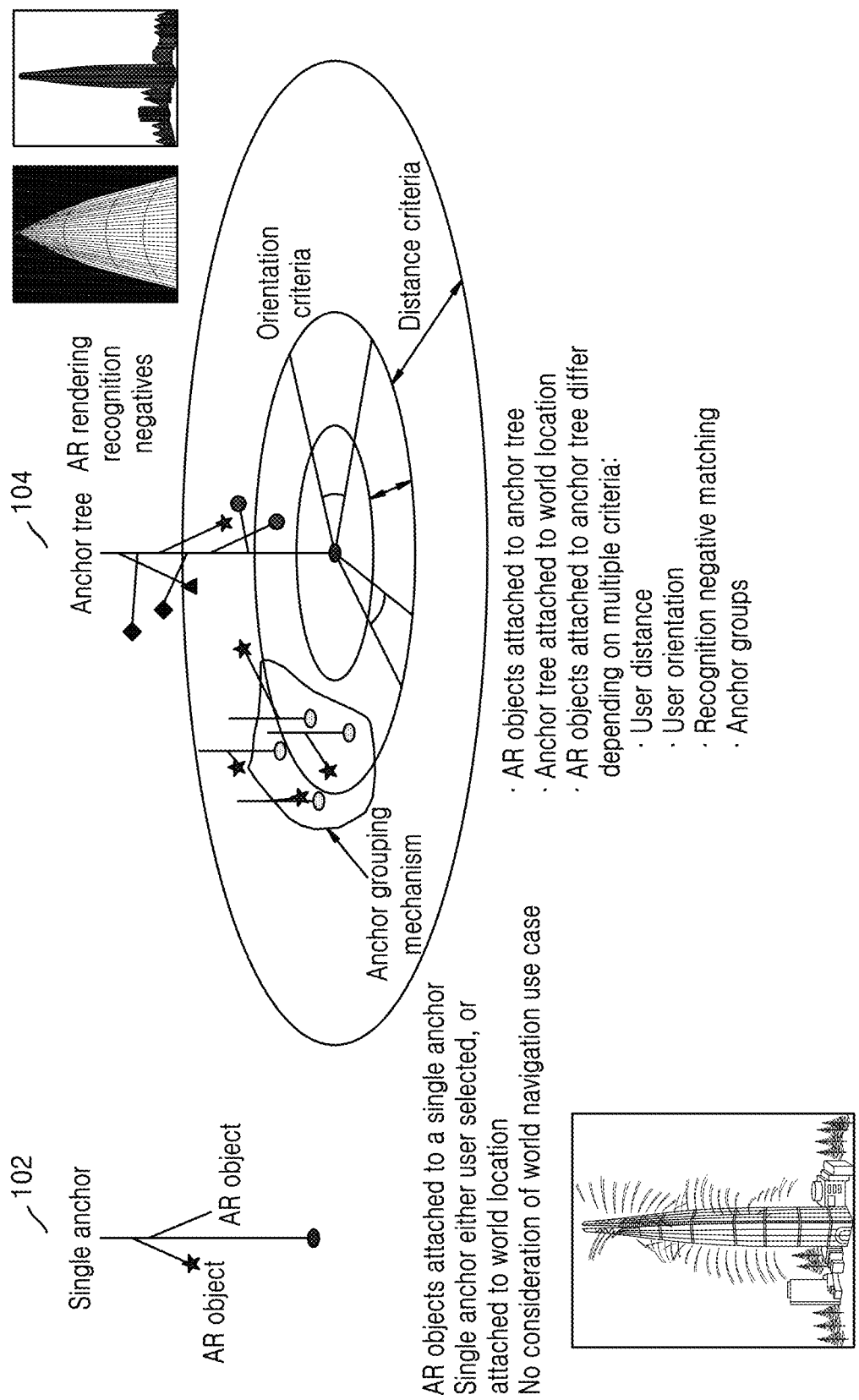
FIG. 1 illustrates a comparison between a single anchor and an anchor tree according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

For the same reason, some components are exaggerated, omitted, or schematically illustrated in the accompanying drawings. Also, the sizes of the components may not reflect their actual sizes. The same reference numbers are allocated to the same or corresponding components in each drawing.

Advantages and features of the disclosure and a method for achieving them will be clear with reference to the accompanying drawings, in which embodiments are shown. However, the disclosure may be embodied in many different forms and should not be construed as being limited to the embodiments set forth below. Rather, the embodiments are provided so that the disclosure will be thorough and complete and will fully convey the concept of the disclosure to those of ordinary skill in the art to which the disclosure pertains, and the disclosure will only be defined by the appended claims. Like reference numerals denote like components throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer-executable or computer readable memory capable of directing a computer or other programmable data processing equipment to implement the functions in a particular manner so that the instructions stored in the computer-executable or computer readable memory are also capable of producing manufacturing items containing instruction means for performing the functions described in the flowchart block(s). Computer program instructions may also be installed on a computer or other programmable data processing equipment so that a series of operations may be performed on a computer or other programmable data processing equipment to create a computer-executable process. Therefore, it is also possible for the instructions to operate the computer or other programmable data processing equipment to provide operations for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks illustrated in succession may be executed substantially simultaneously, or the blocks may sometimes be executed in reverse order depending on functions corresponding thereto.

In this case, the term 'portion', 'module', or 'unit' used in embodiments set forth herein refers to software or a hardware component, such as a field programmable gate array (FPGA) or an application-specific integrated circuit (ASIC), which performs certain functions. However, the term 'portion', 'module', or 'unit' is not limited to software or hardware. The 'portion', 'module', or 'unit' may be configured in an addressable storage medium, or may be configured to run on at least one processor. Therefore, as an example, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules', or 'units' may be combined into a smaller number of components and 'portions', 'modules', and 'units', or sub-divided into additional components and 'portions', 'modules', or 'units'. Also, the components and 'portions', 'modules', or 'units' may be configured to run on one or more central processing units (CPUs) in a device or a security multimedia card. In an embodiment of the disclosure, the 'portion', 'module', or 'unit' may include one or more processors.

The disclosure may be applied to various devices and augmented reality (AR) services. For example, the disclosure may be applied to fields such as AR servers, AR wearable devices (e.g., AR glasses, head mounted displays (HMDs), etc.), mobile AR wearable devices, standalone AR wearable devices, etc. The AR field to which the disclosure may be applied is not limited to the aforementioned examples and may be variously determined.

In the disclosure, a UE refers to one or more apparatuses located around a user and obtaining, processing, or transmitting and receiving data to provide an AR service to the user. The UE may include an AR device, AR glasses, an AR client device, etc. The AR device includes a display and may show AR content to the user by using the display. The UE may have network capability (e.g., $5^{th}$ generation (5G) modem capability) capable of transmitting and receiving data to and from a server via a network. For example, the UE may include a communication module or communication application for communicating with the server.

In the disclosure, the server may be a network for providing an AR service. The server may be a generic term for an AR service provider, a cloud entity, an AR network, an AR core network, a cloud, or a mobile edge computing (MEC) server. The server may include a large-capacity database that stores parameters and the like to provide an AR service.

Any one or more of various communication technologies may be used as a communication technology that may be used for communication between the UE and the server. For example, the UE may communicate with the server by using a communication technology of the 3rd generation partnership project (3GPP) standard such as long term evolution (LTE), 5G, or the like, or a communication technology such as Wi-Fi or the like. The communication technology that may be used for communication between the UE and the server is not limited to the aforementioned examples and may be variously determined.

The disclosure may provide multimedia content processing authoring, selection, fetching, delivering, decoding, and rendering of mixed reality or AR content. The multimedia content according to an embodiment of the disclosure may include three-dimensional (3D) media represented by point clouds and meshes.

The disclosure may provide an apparatus and method of selecting, fetching, delivering, and rendering AR content based on AR anchoring. According to an embodiment of the disclosure, AR anchoring may be performed based on a distance, an orientation, and anchoring negative matching.

AR is a form of a multimedia experience that allows the user to view scenes including both real and virtual content while providing the user with a seamless AR experience in which, without touching the scenes, it is almost impossible for the user to identify what is real and what is virtual in the scenes.

To provide a seamless and realistic AR experience, not only the AR content needs to have high quality, but also rendering placement of the AR content needs to be very accurate. Multimedia in the form of two-dimensional (2D) content does not require any form of interaction, but even in a use case of displaying static AR content, the rendering complexity to render an AR object to appear to be stationary in accordance with the user's movement is much higher compared to the rendering complexity to render 2D content on the display.

To augment AR objects into a surface or space to be realistic at the viewpoint of a viewer, rendering of AR media utilizes anchors. The anchors are usually selected by the user after plane detection or computer vision techniques are performed so that the AR content may be anchored to a surface, an image, an object, a face, etc. The anchors provide a basis for rendering a surface/space of the AR object.

An alternative to the use of the anchors selected by the user is to use anchors based on physical locations in the real world by global positioning system (GPS) location coordinates or any other method to identify physical locations. Unlike an anchor selected by the user in which an AR object is first obtained (fetched or delivered) by a user device before a suitable anchor is identified, the anchors based on the physical locations in the real world are initially triggered by services based on location or tracking before suitable AR objects/media for fetching or rendering are identified. Operations and processes of AR services based on physical anchors in the real world require new criteria such that correct and most suitable AR media is delivered to the user device according to the user's physical location and orientation.

According to the disclosure, the concept of an anchor tree is described that serves as a mechanism for AR devices to identify, fetch, and render AR content identified with particular anchors, such as buildings or objects at physical locations where the AR content is augmented.

FIG. 1 illustrates a comparison between a single anchor and an anchor tree according to an embodiment of the disclosure.

Referring to FIG. 1, an anchor may be a reference point at which an AR object is renderable. The single anchor 102 may be a reference point at which an AR object selected by a user is displayed and may refer to one anchor.

The single anchor 102 may be an existing object and may be selected by the user. For example, the user may select the user's face as an anchor 102. After the anchor 102 is selected, the user may render the AR object on the selected anchor 102. For example, after the user's face is selected as the anchor 102, the user may render an AR object such as a character on the selected user's face. In the case of a single anchor 102 in which a plurality of AR objects are defined, anchoring based on physical locations is not used. For example, as described above, the single anchor 102 is generally directly selected by the user, but the single anchor 102 corresponding to a particular physical location is not selected according to the user's location. In the case of the single anchor 102, after AR media or AR objects are first fetched, a rendering anchor is determined by the user's selection or an application. As described above, the single anchor 102 illustrated in FIG. 1 is selected by the user or attached to a world location. The world location refers to geographical coordinates that may be determined by a GPS or the like. In the case of the single anchor 102 attached to a GPS world location, the user's location of a world navigation relative to a world location anchor is not considered.

The disclosure provides an anchor tree structure 104 including parameters that enable a hierarchical method for defining a plurality of AR objects and content in real world anchors. The real world anchors for the AR objects are usually based on large real objects such as buildings, signages, and other landmarks. Large objects, such as buildings, may be viewed from a variety of distances and orientations, and the disclosure proposes anchor trees that provide AR content fetching criteria, such as a distance between the UE and the anchor tree 104 and an orientation of the UE with respect to the anchor tree 104, to obtain a seamless AR user experience with real world navigation.

By authoring AR content together with metadata for the anchor tree 104, a content producer or service providers may control an augmentation of the AR content and an AR experience at an accurate location at which the AR service is to be provided, based on the real world anchors.

In AR content (e.g., the anchor tree 104 proposed in the disclosure) using anchoring based on physical objects in the real world, the user's location is required to be used as an entry point. By first determining the user's location and surrounding environments, information about the user's location and surrounding environment is used as an entry point for identifying the AR content and fetching the AR service. Unlike the case of the single anchor in which the rendering anchor is determined after the AR objects are first fetched, in the case of the anchor tree 104 according to an embodiment of the disclosure, AR objects corresponding to the determined rendering anchor may be fetched after the rendering anchor is first determined based on the user's location. For example, when the UE is located around the Lotte World Tower, the Lotte World Tower may be selected as an anchor tree 104, and an advertisement corresponding to the Lotte World Tower may be fetched to an anchor tree 104 selected as AR objects.

According to an embodiment of the disclosure, different AR content may be provided according to a location of a UE (e.g., AR glasses), a distance between the UE and the anchor tree 104 and an orientation of the UE with respect to the anchor tree 104. Also, the user's movement trajectory may be utilized for pre-fetching AR content predicted to be augmented onto real world anchors appearing along the user's movement trajectory.

Because real world location coordinates such as GPS coordinates are insufficient to provide a particular rendering anchor, anchor information such as types of anchors (e.g., a horizontal surface, a vertical surface, an image, a face, etc.) may be further used for accurate AR rendering. While the metadata for the anchor tree is mainly used for selection, fetching, and delivery of the AR content, the metadata is also used to determine whether to perform rendering through matching the user's current field of view to a directory of anchoring negatives for the AR content. For example, the anchoring negatives may include a depth map and an RGB map according to a gray scale, and may serve as reference information for identifying whether selection, fetching, and delivery of the AR content are correctly performed.

A hierarchy of the anchor tree 104 proposed in the disclosure may match a real world location (e.g., GPS location coordinates, etc.) with an anchor tree 104 (e.g., a location corresponding to a landmark or a building, etc.) to which AR objects are attached. The AR objects attached to the anchor tree 104 may vary depending on locations of the AR objects in the hierarchy under the anchor tree 104, based on criteria such as a distance, an orientation, matching between the user's field of view and anchoring negatives, and anchor groups.

Figure 2:
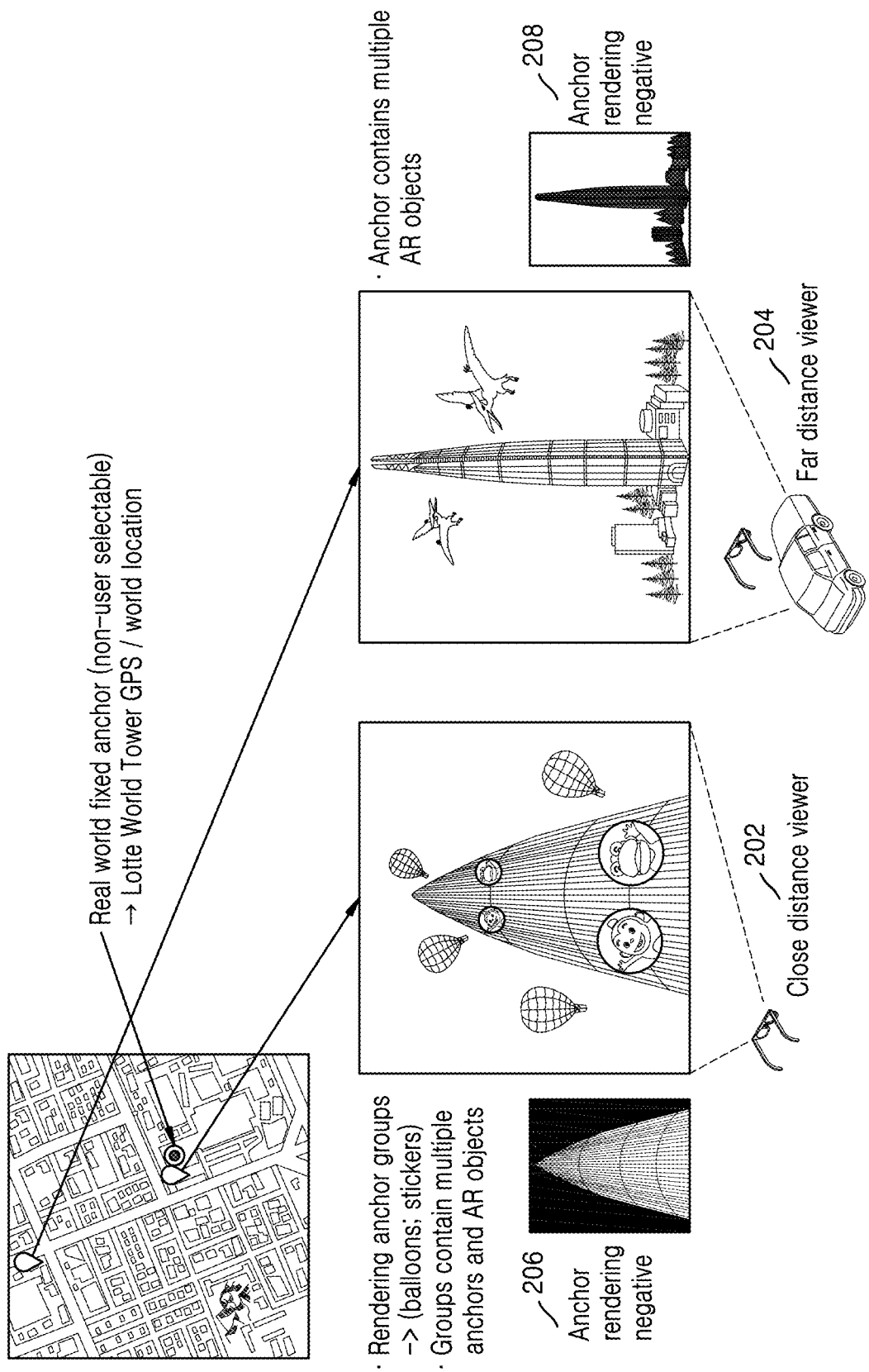
FIG. 2 illustrates an anchor tree according to an embodiment of the disclosure.

FIG. 2 illustrates an anchor tree according to an embodiment of the disclosure.

Referring to FIG. 2, an example of an anchor tree attached to a world location corresponding to the Seoul Lotte World Tower is illustrated. By authoring AR content together with metadata of the anchor tree specified in the disclosure, the AR content viewed by the user may vary depending on a distance and orientation of the user with respect to the anchor tree.

According to an embodiment of the disclosure, the anchor tree corresponding to the Seoul Lotte World Tower may be a fixed anchor, not selected by the user. Accordingly, when the UE is located around the anchor tree, the Seoul Lotte World Tower may be selected as the anchor tree, and AR content corresponding to the selected anchor tree may be fetched. According to an embodiment of the disclosure, the AR content to be fetched may vary depending on a distance between the anchor tree and the UE or an orientation of the UE with respect to the anchor tree. For example, the AR content to be fetched when the distance between the UE and the anchor tree is short may be different from the AR content to be fetched when the distance between the UE and the anchor tree is long. Also, even in a case where the distance between the UE and the anchor tree is the same, when the UE is located in an orientation different from that of the anchor tree, the AR content to be fetched may be different.

Referring to FIG. 2, in a case (202) where a user views the Seoul Lotte World Tower through AR glasses at a close distance, a series of animated character stickers and balloons may be seen augmented near and above the surface of the building. For example, an anchor group may include balloons and stickers as AR objects, and the UE may render the balloons and stickers on the building by rendering the anchor group.

Before performing the rendering, the UE may match, with the user's current field of view, an anchoring negative 206 which is reference information for identifying whether parameters or metadata for the rendering are information corresponding to the user's current field of view. The anchoring negative 206 may be reference information that matches the user's viewpoint information in order to identify whether selection, fetching, and delivery of the AR content are correctly performed. The user's viewpoint information refers to an image, a picture, etc. of the user, by which the UE captures the user's viewpoint. The anchoring negative 206 may be determined based on a distance between the UE and the anchor tree and an orientation of the UE with respect to the anchor tree, and as illustrated in FIG. 2, when the UE and the anchor tree are located at a close distance, the anchoring negative 206 may also represent how the anchor tree appears when viewed at a short distance.

Referring to FIG. 2, in a case (204) where the user views the Seoul Lotte World Tower through AR glasses at a far distance (e.g., in a vehicle traveling along the Han River), the stickers and balloons are not visible, and two dragons surrounding the tower may instead be displayed through a screen of the AR glasses. The AR content to be fetched in the case (202) where the distance between the UE and the anchor tree is short is different from the AR content to be fetched in the case (204) where the distance between the UE and the anchor tree is long, and similarly, the anchoring negative 206 to be fetched in the case (202) where the distance between the UE and the anchor tree is short may be different from an anchoring negative 208 to be fetched in the case (204) where the distance between the UE and the anchor tree is long.

Figure 3:
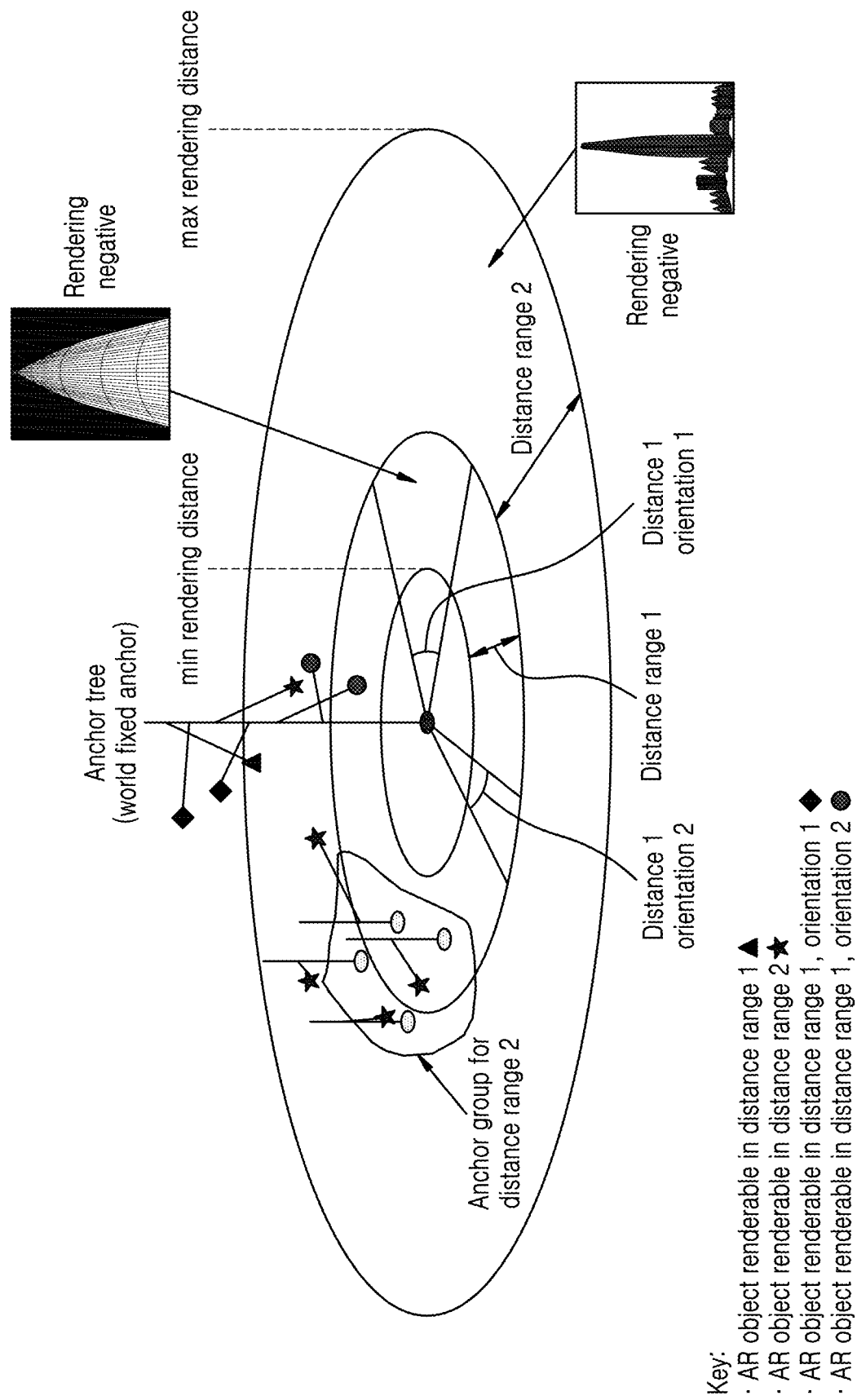
FIG. 3 illustrates a hierarchy of an anchor tree according to an embodiment of the disclosure.

FIG. 3 illustrates a hierarchy of an anchor tree according to an embodiment of the disclosure.

Referring to FIG. 3, in a top-down manner, the anchor tree includes an anchor tree root, minimum and maximum rendering distances, distance ranges, orientations, anchor group, rendering anchors, AR objects, and anchoring negatives.

The anchor tree root may correspond to a fixed anchor tree in the real world. For example, the anchor tree root may correspond to a GPS location coordinates or a building.

The minimum rendering distance and the maximum rendering distance may indicate a rendering range in which the user may view AR content/objects associated with a corresponding anchor tree. For example, when the distance between the UE and the anchor tree is between the minimum rendering distance and the maximum rendering distance, the anchor tree may be selected by the UE, and AR content corresponding to the selected anchor tree may be rendered by the UE, so that the rendered image may be shown to the user.

The distance ranges may enable fetching and rendering of different AR content depending on which anchor tree distance range the user belongs to. For example, when the UE is located within a first distance range based on the anchor tree, AR content to be fetched may be different from AR content to be fetched when the UE is located within a second distance range. The first distance range may be a distance range in which a distance between the anchor tree and the UE is short, and the second distance range may be a distance range in which a distance between the anchor tree and the UE is long. Even when the distance between the UE and the anchor tree is between the minimum rendering distance and the maximum rendering distance, the AR content to be fetched may be different depending on which distance range the current location of the UE belongs to based on the anchor tree.

The orientations may enable fetching and rendering of different AR content depending on an orientation that the user views in association with a world location of the anchor tree, and the orientations may be located under the distance ranges. For example, a first orientation may be defined among areas belonging to the first distance range with respect to the anchor tree, and a second orientation may be defined among areas belonging to the first distance range. In detail, even in a case where the UE belongs to the same distance range based on the anchor tree, when the UE is located in a different orientation based on the anchor tree, the AR content to be fetched may be different. For example, AR content to be fetched when the UE belongs to the first distance range with respect to the anchor tree and is located in the first orientation with respect to the anchor tree may be different from AR content to be fetched when the UE belongs to the first distance range with respect to the anchor tree and is located in the second orientation with respect to the anchor tree.

An anchor grouping mechanism may group rendering anchors under the anchor tree. For example, each of the rendering anchors may have particular rendering anchor coordinates that are relatively specified by a world location of the anchor tree or that is absolutely specified by GPS coordinates. Each of the rendering anchors in the anchor group may include corresponding AR content/objects connected to each of the rendering anchors. The rendering anchor may refer to a rendering point at which AR content displayed on the anchor tree is displayed, and the rendering anchor may refer to a certain location in the anchor tree having a surface suitable for rendering the AR object.

The anchoring negatives may be identified by any of the criteria listed above. The anchoring negatives may include particular AR objects for which accurate augmented rendering of content may be identified through matching with the user's current field of view. For example, the anchoring negatives may include a depth map and an RGB map according to a gray scale, and may serve as reference information for identifying whether selection, fetching, and delivery of the AR content are correctly performed.

Figure 4:
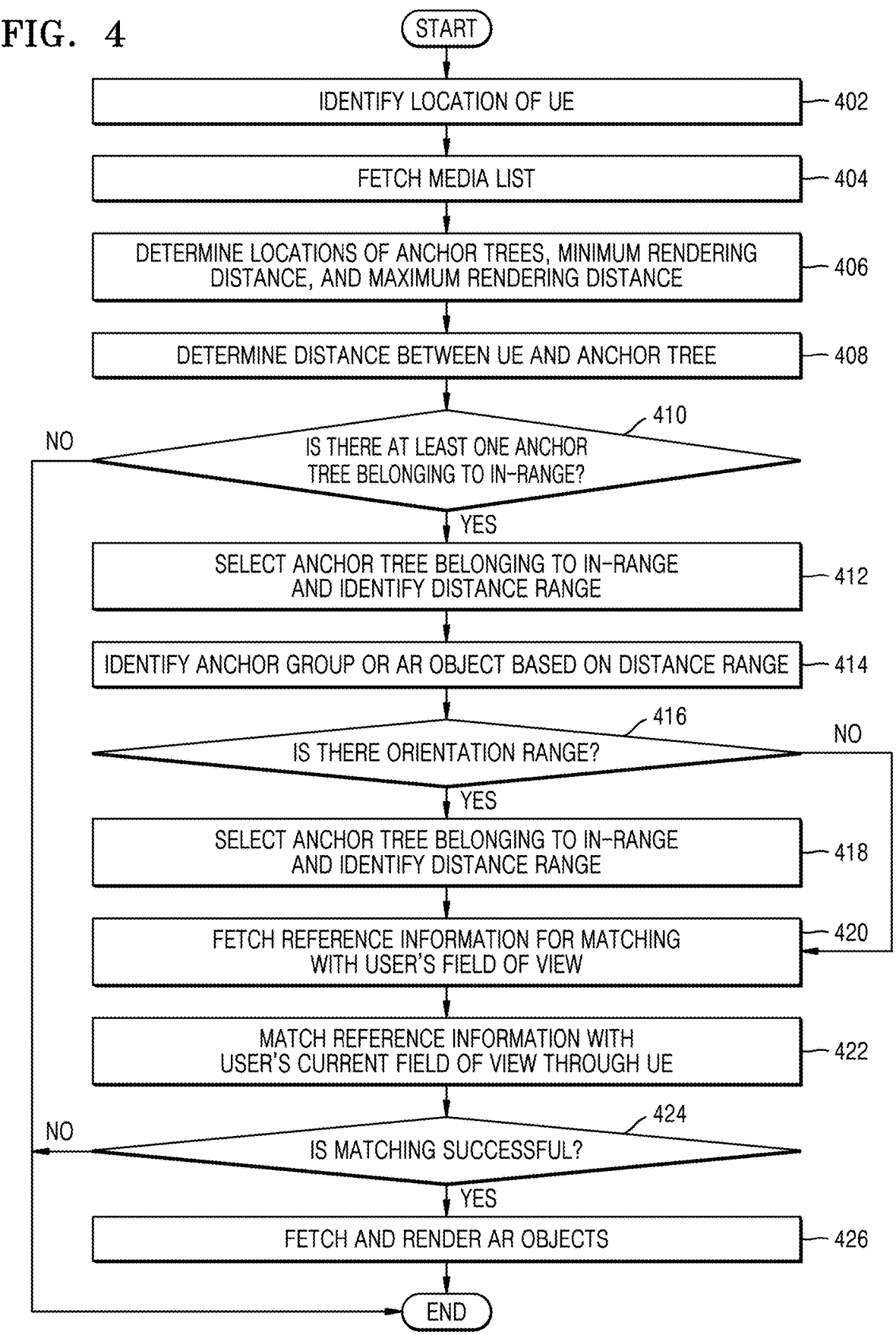
FIG. 4 illustrates a fetching determination operation based on an anchor tree according to an embodiment of the disclosure.

FIG. 4 illustrates a fetching determination operation by a device entity based on an anchor tree according to an embodiment of the disclosure.

An entity is typically an AR client device, but may be an entity present in a server. In this case, the fetching determination operation may be fully offloaded to the server, the AR client device may perform the fetching determination operation, or the AR client device and the server may perform the fetching determination operation together. Alternatively, the entity may be shared between the AR client device and the server.

A fetching operation based on the anchor tree is as follows.

Referring to FIG. 4, in operation 402, a UE may identify a location of the UE. For example, a world location and orientation of a user (client) device may be identified through GPS coordinates or the like. The UE may transmit information about the identified location to the server.

In operation 404, the UE may fetch an anchor tree media service list from the server. For example, the world location and orientation identified in operation 402 may be transmitted to the server to fetch the anchor tree media service list including a list of anchor trees applicable to an area surrounding a user's location. In detail, a size of an area applicable to the list may be determined by a service provider. For example, the server may detect a list of anchor trees included in an area where the UE is located based on location information of the UE received from the UE, and may transmit the detected list to the UE. For example, the anchor trees corresponding to the area where the UE is located may include a first anchor tree, a second anchor tree, and a third anchor tree.

In operation 406, the UE may determine locations, a minimum rendering distance, and a maximum rendering distance of the anchor trees included in the fetched anchor tree media service list. For example, the UE may analyze the locations, the minimum rendering distance, and the maximum rendering distance of the anchor trees based on the anchor tree media service list fetched in operation 404. For example, the UE may analyze a world location of each of the anchor trees listed in the anchor tree media service list and maximum and minimum rendering distances of each of the anchor trees. For example, the UE may determine a location of the first anchor tree, a location of the second anchor tree, and a location of the third anchor tree, and determine maximum and minimum rendering distances of the first anchor tree, maximum and minimum rendering distances of the second anchor tree, and maximum and minimum rendering distances of the third anchor tree.

In operation 408, the UE may calculate a distance between the UE and each of the anchor trees. For example, the UE may determine a distance between the UE and an anchor tree based on the location of the UE determined in operation 402 and the locations of the anchor trees determined in operation 406. In detail, the UE may calculate a distance between the UE and each of the anchor trees included in the anchor tree media service list fetched in operation 404. For example, the UE may determine a distance between the UE and the first anchor tree, a distance between the UE and the second anchor tree, and a distance between the UE and the third anchor tree.

In operation 410, the UE may determine whether the UE falls between the minimum and maximum rendering distances from the anchor tree, based on the minimum and maximum rendering distances determined in operation 406 and the distance between the UE and the anchor tree determined in operation 408. In detail, the UE may compare the distance between the UE and the anchor tree with minimum/maximum range values with respect to each of the corresponding anchor trees. For example, when the distance between the UE and the anchor tree has a value between the minimum and maximum rendering distances, the UE may determine that the anchor tree belongs to an in-range of the UE. The UE may determine that there is at least one anchor tree belonging to the in-range. When there is no anchor tree belonging to the in-range ('No' in operation 410), the fetching operation based on the anchor tree may be terminated.

For example, the UE may determine whether the first anchor tree belongs to the in-range of the UE, based on the distance between the UE and the first anchor tree and the minimum and maximum rendering distances of the first anchor tree. The UE may determine whether the second anchor tree belongs to the in-range of the UE, based on the distance between the UE and the second anchor tree and the minimum and maximum rendering distances of the second anchor tree. Similarly, the UE may determine whether the third anchor tree belongs to the in-range of the UE, based on the distance between the UE and the third anchor tree and the minimum and maximum rendering distances of the third anchor tree.

In operation 412, when the distance between the UE and the anchor tree falls between the minimum and maximum rendering distances ('Yes' in operation 410), the UE may select one or more anchor trees corresponding to the in-range and analyze metadata corresponding to the selected anchor trees. For example, when a distance between the UE and any corresponding anchor tree is included in minimum/maximum range values for the anchor tree, anchor trees are selected, otherwise no anchor tree is selected. In detail, with respect to the selected anchor trees, the UE may analyze corresponding metadata associated with distance ranges under each of the anchor trees and identify a distance range in which the user is currently located.

For example, when only the first anchor tree and the second anchor tree among the first anchor tree, the second anchor tree, and the third anchor tree belong to the in-range, the UE may select the first anchor tree and the second anchor tree as anchor trees belonging to the in-range. The UE may analyze information about distance ranges of the anchor trees selected from the anchor tree media service list fetched in operation 404. For example, the UE may identify, from the anchor tree media service list, whether a plurality of distance ranges are defined for the selected first anchor tree and second anchor tree and what distance range the UE corresponds to.

In operation 414, the UE may identify anchor groups or AR objects for the one or more anchor trees selected in operation 412. For example, the UE may identify anchor groups and AR objects that are attached to a current anchor tree distance range for each of the anchor trees selected in operation 412.

For example, the UE may identify anchor groups and AR objects corresponding to the distance range identified in operation 412. In detail, after a distance range to which the UE belongs is identified with respect to each of the selected anchor trees, the UE may identify, from the anchor tree media service list, anchor groups or AR objects corresponding to the identified distance range. For example, when the UE belongs to the first distance range for the first anchor tree, the UE may identify anchor groups or AR objects for the first distance range of the first anchor tree. Also, when the UE belongs to the second distance range for the second anchor tree, the UE may identify anchor groups or AR objects for the second distance range of the second anchor tree.

In operation 416, the UE may determine whether a distance range for each of the selected one or more anchor trees is further identified according to an orientation. When the distance range for each of the selected one or more anchor trees is not further identified according to the orientation ('No' in operation 416), operation 420 may be performed.

For example, the UE may determine whether there is an orientation range for the distance range identified in operation 412. For example, when the UE belongs to the first distance range for the first anchor tree, the UE may determine whether there is an orientation range for the first distance range of the first anchor tree. Also, when the UE belongs to the second distance range for the second anchor tree, the UE may determine whether there is an orientation range for the second distance range of the second anchor tree.

In operation 418, when the distance range for each of the selected one or more anchor trees is further identified according to the orientation ('Yes' in operation 416), the UE may identify anchor groups or AR objects belonging to the distance range and belonging to an orientation matching a current orientation of the UE. For example, when a current distance range is further divided into orientation ranges, the UE may identify anchor groups and AR objects that are attached to an orientation range matching a current orientation of a device.

For example, the UE may identify which orientation range the UE belongs to from an anchor tree for an anchor tree in which the orientation range exists. The UE may identify anchor groups or AR object for the identified orientation range from the anchor tree media service list. For example, when there are a plurality of orientation ranges for the first distance range of the first anchor tree, the UE may identify that the UE belongs to a first orientation range within the first distance range of the first anchor tree. The UE may identify anchor groups or AR objects for the first orientation range within the first distance range of the first anchor tree based on metadata provided from the server. When there is no orientation range for the second distance range of the second anchor tree, the UE may skip operation 418.

In operation 420, the UE may fetch reference information about the AR objects identified operation 414 or 418 from the server. For example, the reference information may include a depth map and an RGB map according to a gray scale and may be used to identify whether selection, fetching, and delivery of AR content are correctly performed. The reference information may selectively include anchoring negatives. In detail, the UE may fetch anchoring negatives for the AR objects and anchor groups identified in operation 414 or 418. The anchoring negatives may be directly associated with the distance ranges, the orientation ranges, or the anchor groups and the AR objects. For example, the UE may fetch the reference information from the server to match the user's field of view.

According to an embodiment of the disclosure, operation 420 may include fetching AR objects together with anchoring negatives in a use case where latency demand for content delivery is important.

In operation 422, the UE may match the reference information fetched in operation 420 with the user's current field of view through the UE. For example, the UE may continuously capture an image of an orientation viewed by the user through a camera or the like, and the UE may compare information obtained through image capturing with the fetched reference information. For example, the UE may match the anchoring negatives to a current user/device's field of view for rendering determination.

In operation 424, the UE may determine whether the matching in operation 422 is successful. When the reference information does not match the user's current field of view ('No' in operation 424), the UE may determine not to perform rendering.

In operation 426, when the reference information is to be matched with the user's current field of view ('Yes' in operation 424), the UE may render the AR objects and anchor groups identified in operation 414 or 418. For example, when the matching in operation 422 is successful, the identified AR objects (and anchor groups) may be fetched and rendered according to an associated rendering anchor of each of the AR objects (the rendering anchor of the AR object may be an anchor tree or an anchor attached to the anchor tree).

Figure 5:
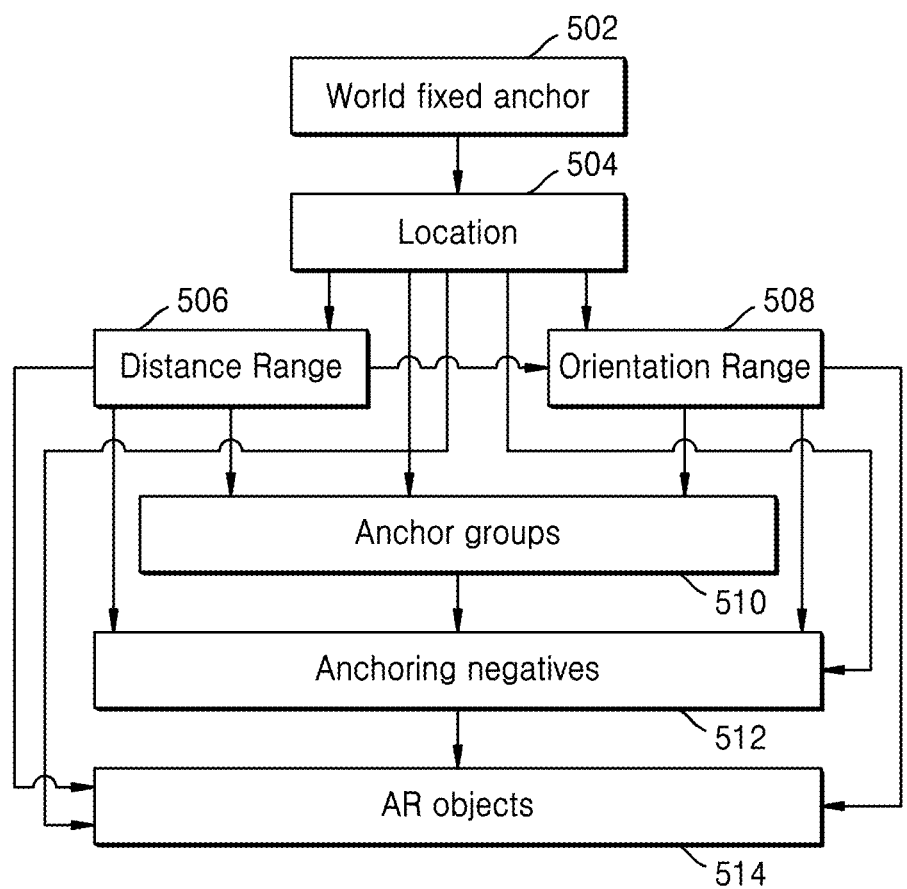
FIG. 5 illustrates a hierarchical relationship of parameters according to an embodiment of the disclosure.

FIG. 5 illustrates media anchor tree parameters and a hierarchical relationship of the parameters according to an embodiment of the disclosure.

A relationship between the parameters enables certain parameters to be satisfied only when parent criteria are satisfied. For example, an anchor group, which is a child for a particular orientation range, which is a child for a particular distance range, may be fetched only when a user device satisfies both distance range and orientation range parameter criteria.

Referring to FIG. 5, in detail, a parameter 502 for the anchor tree may include a parameter 504 indicating a location of an anchor tree, a parameter 506 for the distance range, and a parameter 508 for the orientation range. The parameter 506 for distance range is a parameter indicating a distance range that may be rendered based on the location of the anchor tree, and the parameter 508 for the orientation range is a parameter indicating an orientation range that may be rendered based on the location of the anchor tree.

Thus, according to an embodiment, the parameter 504 indicating the location of the anchor tree may correspond to an upper layer than the parameter 506 for the distance range and the parameter 508 for the orientation range. According to an embodiment, the parameter 506 for the distance range and the parameter 508 for the orientation range may be equivalent layers. However, the hierarchical relationship between the parameter 506 for the distance range and the parameter 508 for the orientation range is not limited thereto. According to an embodiment, the parameter 506 for the distance range may correspond to an upper layer than the parameter 508 for the orientation range.

A parameter 510 for the anchor group may be included in each of the parameter 506 for the distance range and the parameter 508 for the orientation range. In addition, a parameter 512 for an anchoring negative indicating the reference information for matching with the user's field of view through the UE may also be included in the parameter 506 for the distance range and the parameter 508 for the orientation range, respectively, and a parameter 514 for an AR object may also be included in the parameter 506 for the distance range and the parameter 508 for the orientation range, respectively. Thus, according to an embodiment, the parameter 510 for the anchor group, the parameter 512 for the anchoring negative, and the parameter 514 for the AR object may correspond to lower layers for the parameter 506 for the distance range and the parameter 508 for the orientation range.

According to an embodiment, the parameter 512 for the anchoring negative may be a lower layer of the parameter 510 for the anchor group, and the parameter 514 for the AR object may be a lower layer of the parameter 512 for the anchoring negative. However, the hierarchical relationship between the parameters illustrated in FIG. 5 is not limited thereto, and a detailed description of the hierarchical relationship may be different from the above according to embodiments.

Figure 6:
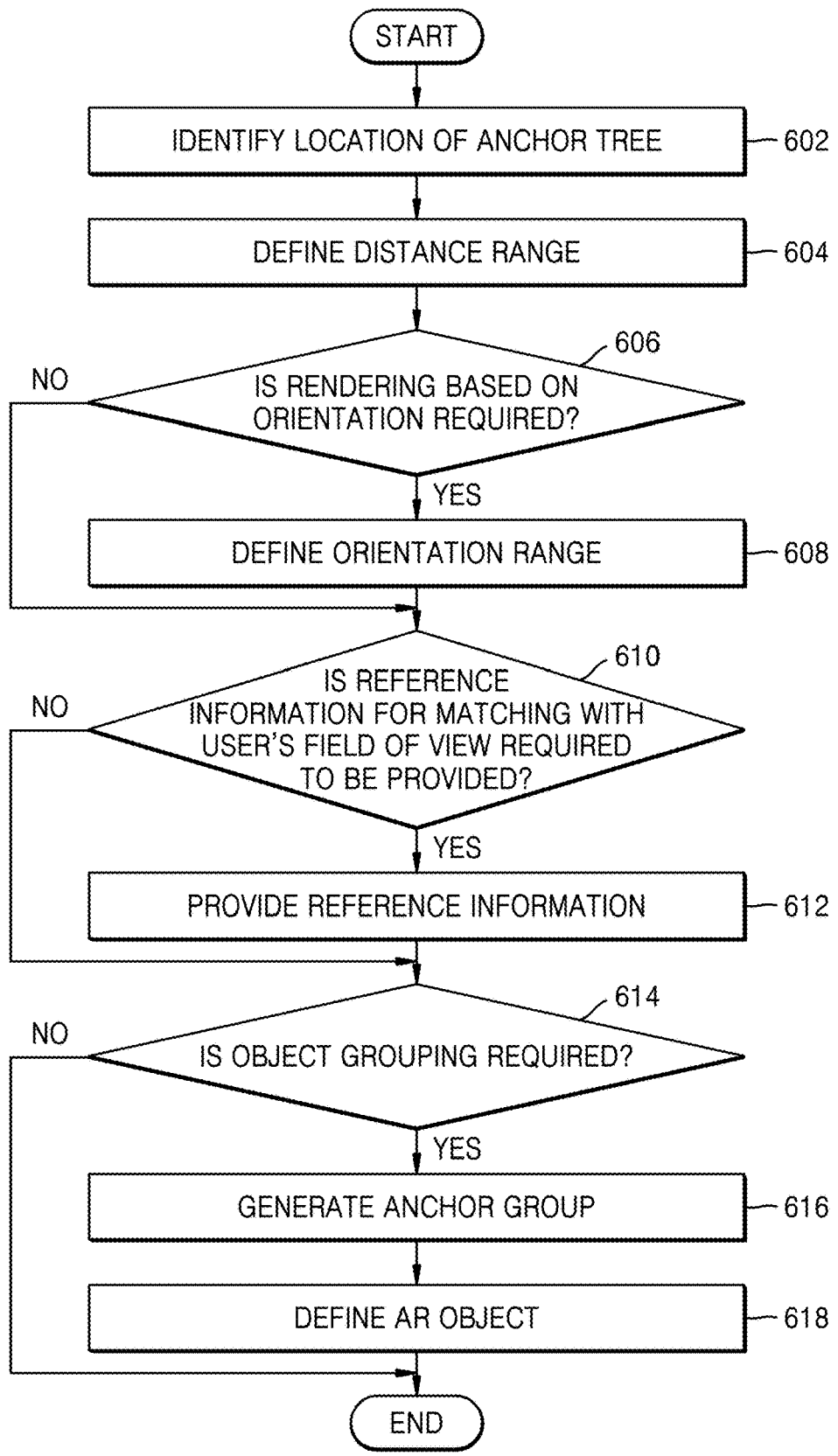
FIG. 6 illustrates an authoring operation performed by a content provider or augmented reality (AR) service provider, according to an embodiment of the disclosure.

FIG. 6 illustrates an authoring operation performed by a content provider or service provider according to an embodiment of the disclosure.

The content provider may be a producer of AR content, and the content provider may provide the AR content through an AR server. An AR service provider may correspond to the AR server. For example, in a case where an advertising company advertises AR content via a telecommunications company by using the Lotte World Tower as an anchor tree, the content provider may be an advertising company and the AR server may be a telecommunications company. However, when the AR server performs production of the AR content on behalf of another entity, the AR server may correspond to the content provider.

Referring to FIG. 6, an operation of authoring anchor tree content is as follows.

In operation 602, a location and orientation of the anchor tree may be identified. For example, a world pose (location and orientation) of the anchor tree may be identified according to the AR content and an intended augmented location of the AR content.

In operation 604, distance ranges for the anchor tree may be defined. In detail, the distance ranges for the anchor tree may be defined according to features of AR media content attached to the anchor tree. For example, the distance ranges may be defined so that different AR media content may be viewed to the user according to different distances from the pose of the anchor tree.

In operation 606, it may be determined whether fetching or rendering based on the orientation needs to be performed.

In operation 608, when the anchor tree requires multi-orientation based on fetching/rendering ('Yes' in operation 606), rendering orientation ranges for the anchor tree may be defined according to the features of the AR media content. The orientation ranges may be present directly under the anchor tree (for all distance ranges) or only under a particular distance range.

In operation 610, it may be determined whether reference information for matching the user's field of view through the UE is to be provided.

In operation 612, when the reference information is provided ('Yes' in operation 610), reference information corresponding to at least one of the distance ranges defined in operation 604 or the orientation ranges defined in operation 608 may be provided. For example, when recognition negative matching services are provided, anchoring negatives (e.g., depth maps) may be provided as a database for augmented screens intended by the user. For example, the anchoring negatives may be defined in the content or may be defined in other criteria.

In operation 614, it may be determined whether AR groups require AR object grouping.

In operation 616, when the AR groups require AR object grouping ('Yes' in operation 614), anchor groups may be generated. For example, anchor groups for AR content that require fetching or rendering as a group may be generated.

In operation 618, the AR objects may be defined for the parameters of the anchor tree. For example, the AR objects may be defined directly under the parameters or anchor tree defined in operations 604 through 616. In detail, each of the AR objects may include the same rendering anchor as the pose of the anchor tree. The AR objects may be defined relative to the pose of the anchor tree or may be individually defined by using a real world pose.

Table 1 represents syntax of parameters of the anchor tree generated through the authoring operation described with reference to FIG. 6 and transmitted to the UE described with reference to FIG. 4 to be used by the UE.

TABLE 1

```
Syntax
class AnchorTree {
        Pose( )
        unsigned int( )    anchor_tree_id;
        unsigned int( )    min_distance;
        unsigned int( )    max_distance;
        unsigned int( )    num_distance_ranges;
        unsigned int( )    num_orientation_ranges;
        for (i=0; i< num_distance_ranges; i++){
        DistanceRange( )
        }
        for (i=0; i< num_orientation_ranges; i++){
        OrientationRange( )
        }
        unsigned int( )    num_anchor_groups;
        unsigned int( )    num_AR_objects;
         for (i=0; i< num_anchor_groups, i++){
                AnchorGroup( )
                }
        for (i=0; i< num_AR_objects; i++){
                ARObject( )
        }
class Pose {
        unsigned int( )    pose_type;
        if (pose_type=0){
                signed int( )      gps_latitude;
                signed int( )      gps_longitude;
                signed int( )      world_orientation;
        }
        if(pose_type=1){
                signed int( )      position_x;
                signed int( )      position_y;
                signed int( )      position_z;
                signed int( )      orientation_x;
                signed int( )      orientation_y;
                signed int( )      orientation_z;
                signed int( )      orientation_w;
                }
        }
class DistanceRange{
        unsigned int( )    min_distance_range;
        unsigned int( )    max_distance_range;
        unsigned int( )    distance_range_id;
        unsigned int( )    num_distance_orientations;
        for (i=0; i< num_distance_orientations; i++){
                unsigned int( )    orientation_range_id;
        }
        unsigned int( )    num_anchor_groups;
        unsigned int( )    num_AR_objects;
        for (i=0; i< num_anchor_groups; i++){
                AnchorGroup( )
                }
        for (i=0; i< num_AR_objects; i++){
                ARObject( )
        }
class OrientationRange{
        unsigned int( )    min_orientation_range;
        unsigned int( )    max_orientation_range;
        unsigned int( )    orientation_range_id;
        unsigned int( )    num_anchor_groups;
        unsigned int( )    num_AR_objects;
```

TABLE 1-continued

```
            for (i-=0; i< num_anchor_groups; i++){
                    AnchorGroup( )
            }
            for (i=0; i< num_AR_objects; i++){
                    ARObject( )
            }
    class AnchorGroup {
            unsigned int( )      anchor_group_id;
            unsigned int( )      num_AR_objects;
            for (i=0; i< num_AR_objects; i++){
                    ARObject( )
            }
    }
    class ARObject {
            unsigned int( )      object_id;
            RenderingAnchorInfo( )
    }
    class RenderingAnchorInfo {
            Pose( )
            unsigned int( )      anchor_id;
            unsigned int( )      anchor_type;
```

Semantics of the parameters in Table 1 are as follows.

anchor_tree_id specifies an identifier for the anchor tree.

min_distance and max_distance specify, in units of meters, a minimum rendering distance and a maximum rendering distance of a circle radius at which the anchor tree may render AR content, respectively, focusing on the pose of the anchor tree.

num_distance_ranges specifies the number of distance ranges defined under the anchor tree.

num_orientation_ranges specifies the number of orientation ranges defined under the anchor tree. Orientation ranges specified under a particular distance range are applicable only within the particular distance range.

num_anchor_groups specifies the number of anchor groups defined under a corresponding layer (e.g., anchor tree, distance range, or orientation range) in a syntax structure according to a location of the corresponding layer.

num_AR_objects specifies the number of AR objects defined under a corresponding layer (e.g., anchor tree, distance range, or orientation range) in a syntax structure according to a location of the corresponding layer.

pose_type specifies how a pose of an anchor is defined. When a syntax element describes the pose of the anchor tree, a value of pose_type is set to a value of '0'. When the value of pose_type has a value of '0', the pose of the anchor is specified by real world GPS coordinates and a world orientation, and when the value of pose_type has a value of '1', the pose of the anchor is specified by using relative location and orientation coordinates with a real world pose location and orientation of the anchor tree as a reference point.

gps_latitude and gps_longitude specify, in decimal degrees, the latitude and longitude of GPS coordinates defined as a location of the pose.

world_orientation specifies a world compass orientation defined as a pose orientation for the pose (e.g., an x-axis in a right-handed coordinate system) in degrees, which is a unit of angle (e.g., 0° corresponds to the true north direction). The coordinate system is a right-handed coordinate system in which y-axis points are vertically oriented upward and perpendicular to the x-axis.

position_x, position_y, and position_z specify, in units of meters, values of x, y, and z coordinates of pose location coordinates relative to a real world GPS coordinate location, respectively.

orientation_x, orientation_y, orientation_z, and orientation_w specify x, y, z, and w components of an orientation quaternion that represent orientations of the pose, respectively. w is a real number of the quaternion, and x, y, and z are imaginary numbers of the quaternion.

min_distance range and max_distance range specify, in units of meters, a minimum value and a maximum value of a rendering distance of a distance range, respectively, focusing the pose of the anchor tree.

distance_range_id specifies an identifier of the distance range.

num_distance_orientations specifies the number of orientation ranges defined under a particular distance range.

min_orientation_range and max_orientation_range specify a minimum value and a maximum value of a rendering orientation of an orientation range in degrees, which is a unit of angle. 0° corresponds to the true north orientation at the real world GPS location of the anchor tree.

orientation_range_id specifies an identifier of the orientation range.

anchor_group_id specifies an identifier for the anchor group.

object_id specifies an identifier for the AR object.

anchor_id specifies an identifier for the rendering anchor.

anchor_type specifies a rendering anchor type of an anchor as one of the types listed in Table 2 below.

TABLE 2

| Value | Description |
| --- | --- |
| 0 | Horizontal plane |
| 1 | Vertical plane |
| 2 | Image |
| 3 | Face |
| 4 | Object |

Figure 7:
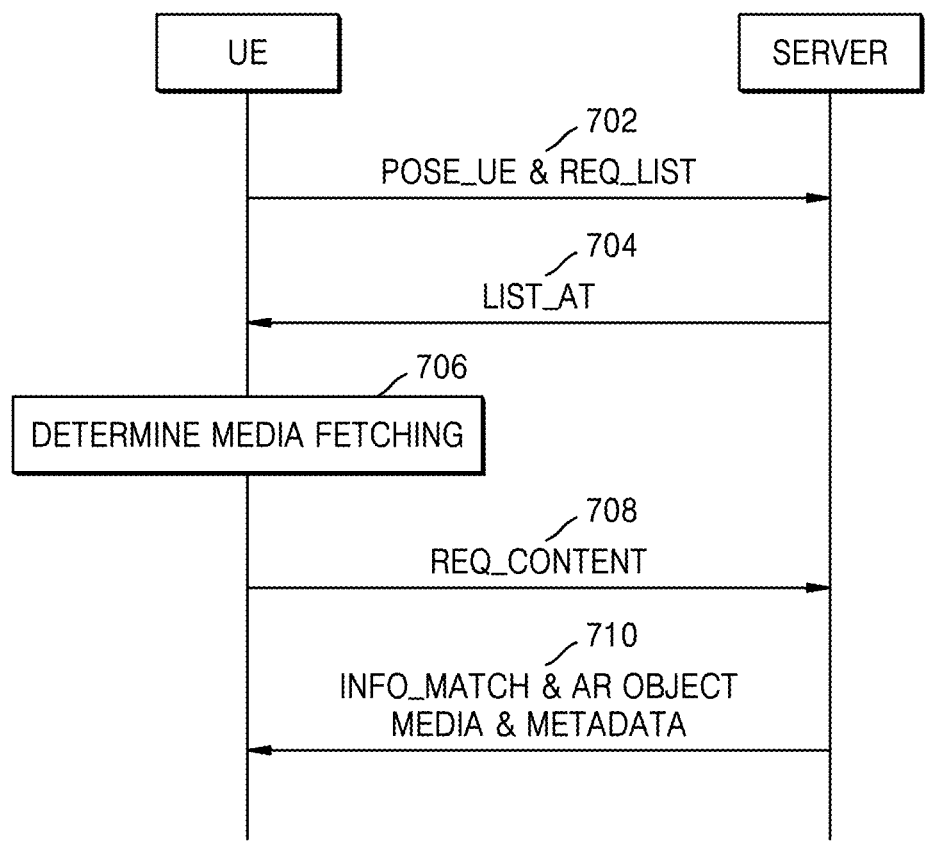
FIG. 7 illustrates a media request procedure between a user equipment (UE) and a server, according to an embodiment of the disclosure.

FIG. 7 illustrates a media request procedure between a UE and a server, according to an embodiment of the disclosure.

Referring to FIG. 7, in operation 702, the UE may transmit a current pose POSE_UE of the UE to the server along with a request REQ_LIST of a world anchor tree media list. For example, the current pose POSE_UE of the UE may include information about a location and orientation of the UE. Also, as described above, the server may correspond to an AR service provider.

In operation 704, the server transmits a reply with an anchor tree media list LIST_AT based on a predetermined area in which the UE is currently located. The anchor tree media list LIST_AT includes a list of a plurality of anchor trees in a service area, and each of the anchor trees includes anchor tree parameters described above with reference to Table 1.

For example, when a current location of the UE is Songpa-gu, the anchor tree media list LIST_AT may include information about anchor trees included in the Songpa-gu. In detail, when a first anchor tree, a second anchor tree, and a third anchor tree are included in the Songpa-gu, the anchor tree media list may include information about the first anchor tree, the second anchor tree, and the third anchor tree.

In operation 706, the UE performs a media fetching determination operation described above with reference to FIG. 4. In detail, the UE may perform operations 406 through 418 of FIG. 4. For example, the UE may determine a location, a minimum rendering distance, and a maximum rendering distance of an anchor tree included in the anchor tree media list LIST_AT, based on the anchor tree media list LIST_AT received in operation 704. When a plurality of anchor trees are included in the anchor tree media list LIST_AT, a location, a minimum rendering distance, and a maximum rendering distance of an anchor tree may be determined for each of the anchor trees.

The UE may determine a distance between the UE and the anchor tree based on the location of the anchor tree and the location of the UE. The UE may determine whether there is at least one anchor tree belonging to an in-range based on the minimum rendering distance, the maximum rendering distance, and the distance between the UE and the anchor tree. The anchor tree belonging to the in-range may refer to an anchor tree in which a distance between the UE and the anchor tree is between the minimum rendering distance and the maximum rendering distance.

When there is at least one anchor tree belonging to the in-range, the UE may select an anchor tree belonging to the in-range and identify a distance range for the selected anchor tree. When there are a plurality of distance ranges for the anchor tree, an AR object to be fetched may be different depending on the distance range. The UE may identify an anchor group or an AR object based on the identified distance range.

When the selected anchor tree also has an orientation range, the UE may identify the anchor group or the AR object in consideration of both the distance range and the orientation range. For example, even though the distance range is the same, when the orientation range is different, the AR objects to be fetched may be different.

In operation 708, the UE may transmit, to the server, a request REQ_CONTENT for AR content required for rendering. For example, the AR content required for rendering may include at least one of AR objects, AR groups, or rendering anchors. For example, the UE requests identified anchor groups and/or AR objects from the AR service provider.

When AR content to be requested is associated with the AR object, the UE may request the identified AR objects from the AR service provider through an identifier (object_id) for the AR object.

Alternatively, the UE may request an object associated with identified rendering anchors from the AR service provider through an identifier (anchor_id) for the rendering anchor.

When the AR content to be requested is associated with an AR anchor group, the UE may request identified AR groups from the AR service provider through an identifier (anchor_group_id) for the anchor group.

In operation 710, the server may transmit, to the UE, reference information INFO_MATCH for matching with the user's current field of view, AR object media AR OBJECT MEDIA corresponding to the request REQ_CONTENT for the AR content transmitted in operation 708, and metadata METADATA for rendering. For example, the server may transmit, to the UE, an anchoring negative corresponding to the reference information INFO_MATCH and the AR object media AR OBJECT MEDIA together with the metadata METADATA required for rendering.

For example, when the server receives the identifier (object_id) for the AR object from the UE, the AR object media AR OBJECT MEDIA that the server transmits to the UE may include AR objects. When the server receives the identifier (anchor_id) for the rendering anchor from the UE, the AR object media AR OBJECT MEDIA that the server transmits to the UE may include rendering anchors. When the server receives the identifier (anchor_group_id) for the anchor group from the UE, the AR object media AR OBJECT MEDIA that the server transmits to the UE may include anchor groups.

Figure 8:
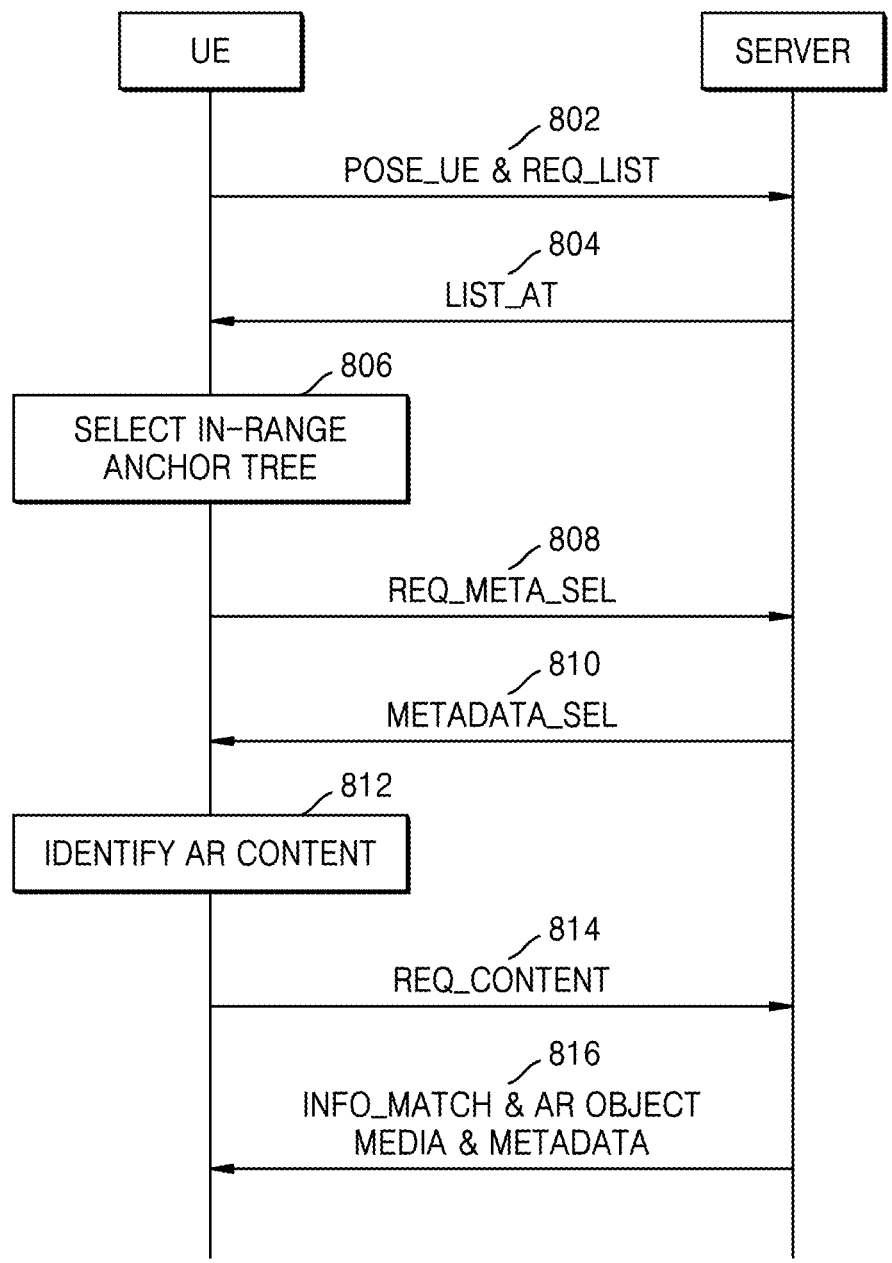
FIG. 8 illustrates a media request procedure between a UE and a server, according to an embodiment of the disclosure.

FIG. 8 illustrates a media request procedure between a UE and an AR service provider, according to another embodiment of the disclosure.

Referring to FIG. 8, in operation 802, the UE may transmit a current pose POSE_UE of the UE to a server along with a request REQ_LIST of a world anchor tree media list. For example, the UE may request the server for a world anchor tree media list that includes a pose of an anchor tree and minimum/maximum rendering distance parameters (min_distance and max_distance).

In operation 804, the server replies with an anchor tree media list LIST_AT based on a predetermined service area in which the UE is currently located. The anchor tree media list includes a list of multi-anchor trees in the service area, and each of the anchor trees includes minimum/maximum rendering distance parameters (min_distance and max_distance) and the pose of the anchor tree described with reference to Table 1.

In operation 806, the UE may perform an in-range anchor tree selection procedure described above with reference to operation 412 in FIG. 4.

In operation 808, the UE transmits, to the server, a request REQ_META_SEL of identified metadata corresponding to selected anchor trees.

In operation 810, the server transmits, to the UE, metadata METADATA_SEL corresponding to the selected anchor trees. While this operation is being performed, the server may select to transmit anchoring negatives to the UE.

In operation 812, the UE selects anchor groups/rendering anchors/AR objects to be rendered, as described above with reference to FIG. 4.

In operation 814, the UE transmits, to the server, a request REQ_CONTENT for the anchor groups/rendering anchors/AR objects identified in operation 812 described above for rendering.

In operation 816, the server transmits, to the UE, corresponding anchoring negatives INFO_MATCH (when not transmitted in operation 810) and AR object media AR OBJECT MEDIA corresponding to the anchor groups/rendering anchors requested in operation 814 (along with corresponding metadata METADATA).

The multistage request approach allows the UE to receive only metadata/anchor tree parameters that the UE requires according to a location and orientation of the UE. For service areas with many anchor trees, this can increase a client's analysis and rendering efficiency.

Figure 9:
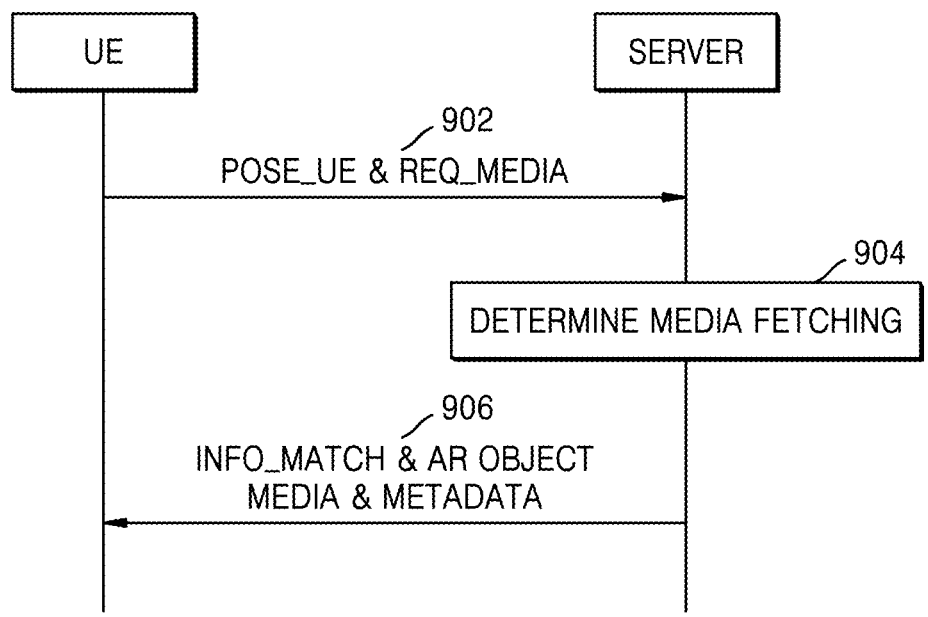
FIG. 9 illustrates a media request procedure between a UE and a server, according to an embodiment of the disclosure.

FIG. 9 illustrates a media request procedure between a UE and a server when fetching determination is performed by a service provider or a cloud entity according to an embodiment of the disclosure.

Referring to FIG. 9, in operation 902, the UE transmits a current pose POSE_UE of the UE to the server along with a request REQ_MEDIA of AR media.

In operation 904, the server performs a media fetching determination operation as described above with reference to FIG. 4.

In operation 906, the server transmits, to the UE, corresponding anchoring negatives INFO_MATCH and AR object media AR OBJECT MEDIA corresponding to selected outputs of media fetching determination (along with corresponding metadata METADATA).

Figure 10:
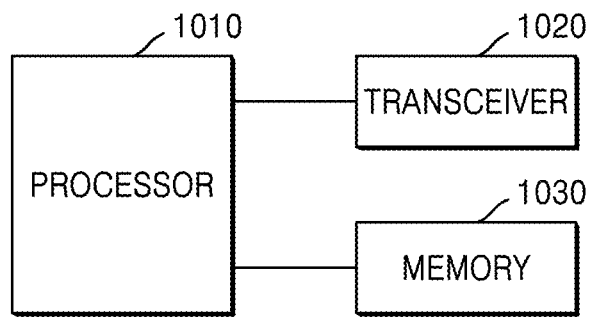
FIG. 10 is a diagram for describing a configuration of a UE according to an embodiment of the disclosure.

FIG. 10 is a diagram for describing a configuration of a UE according to an embodiment of the disclosure.

The UE, AR device, or AR client device described above with reference to FIGS. 1 to 9 may have the configuration of FIG. 10. Hereinafter, for convenience of description, the UE is described as an example.

Referring to FIG. 10, the UE may include a transceiver 1020, a memory 1030, and a processor 1010. However, the components of the UE are not limited to the aforementioned example. For example, the UE may include more or fewer components than the aforementioned components. For example, the UE may not include the memory 1030. Also, the transceiver 1020, the memory 1030, and the processor 1010 may be implemented in the form of a single chip. Also, the processor 1010 may include one or more processors.

The transceiver 1020 is a generic term of a receiver and a transmitter and may transmit and receive a signal to and from a server. For example, the transceiver 1020 may transmit and receive a control signal, media data, and metadata. To this end, the transceiver 1020 may include an RF transmitter for up-converting a frequency of a transmitted signal and amplifying the transmitted signal an RF receiver for low-noise amplifying a received signal and down-converting a frequency of the received signal. However, this is only an embodiment of the transceiver 1020, and the components of the transceiver 1020 are not limited to the RF transmitter and the RF receiver.

Also, the transceiver 1020 may receive a signal through a radio channel and output the signal to the processor 1010, and may transmit a signal output from the processor 1010 through a radio channel.

The memory 1030 may store a program and data required for operations of the UE. Also, the memory 1030 may store media data or metadata included in a signal obtained by the UE. The memory 1030 may be configured as a storage medium such as a read-only memory (ROM), a random-access memory (RAM), a hard disk, a compact disc (CD)-ROM, a digital versatile disc (DVD), or the like, or a combination of storage media. Also, the memory 1030 may not exist separately and may be included in the processor 1010.

The processor 1010 may control a series of processes so that the UE may operate according to the aforementioned embodiments of the disclosure. For example, the processor 1010 may receive a control signal, media data, and metadata via the transceiver 1020, and may process the received control signal, media data, and metadata. Also, the processor 1010 may transmit the processed control signal, media data, and metadata via the transceiver 1020. The processor 1010 may be provided as a plurality of processors and may perform a control operation for the components of the UE by executing a program stored in the memory 1030.

Figure 11:
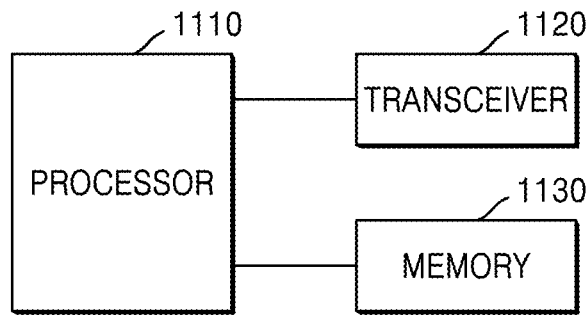
FIG. 11 is a diagram for describing a configuration of a server according to an embodiment of the disclosure.

FIG. 11 is a diagram for describing a configuration of a server according to an embodiment of the disclosure.

The cloud, server, or MEC server described above with reference to FIGS. 1 to 9 may have the configuration of FIG. 11. Hereinafter, for convenience of description, the server is described as an example.

Referring to FIG. 11, the server may include a transceiver 1120, a memory 1130, and a processor 1110. However, the components of the server are not limited to the aforementioned example. For example, the server may include more or fewer components than the aforementioned components. For example, the server may not include the memory 1130. Also, the transceiver 1120, the memory 1130, and the processor 1110 may be implemented in the form of a single chip. Also, the processor 1110 may include one or more processors.

The transceiver 1120 is a generic term of a receiver and a transmitter and may transmit and receive a signal to and from a UE. For example, the transceiver 1120 may transmit and receive a control signal, media data, and metadata. To this end, the transceiver 1120 may include an RF transmitter for up-converting a frequency of a transmitted signal and amplifying the transmitted signal an RF receiver for low-noise amplifying a received signal and down-converting a frequency of the received signal. However, this is only an embodiment of the transceiver 1120, and the components of the transceiver 1120 are not limited to the RF transmitter and the RF receiver.

Also, the transceiver 1120 may receive a signal through a radio channel and output the signal to the processor 1110, and may transmit a signal output from the processor 1110 through a radio channel.

The memory 1130 may store a program and data required for operations of the server. Also, the memory 1130 may store media data or metadata included in a signal obtained by the server. The memory 1130 may include a storage medium such as a ROM, a RAM, a hard disk, a CD-ROM, or a DVD, or a combination of storage media. Also, the memory 1130 may not exist separately and may be included in the processor 1110.

The processor 1110 may control a series of processes so that the server may operate according to the aforementioned embodiments of the disclosure. For example, the processor 1110 may receive a control signal, media data, and metadata via the transceiver 1120, and may process the received control signal, media data, and metadata. Also, the processor 1110 may transmit the processed control signal, media data, and metadata via the transceiver 1120. The processor 1110 may be provided as a plurality of processors and may perform a control operation for the components of the server by executing a program stored in the memory 1130.

Figure 12:
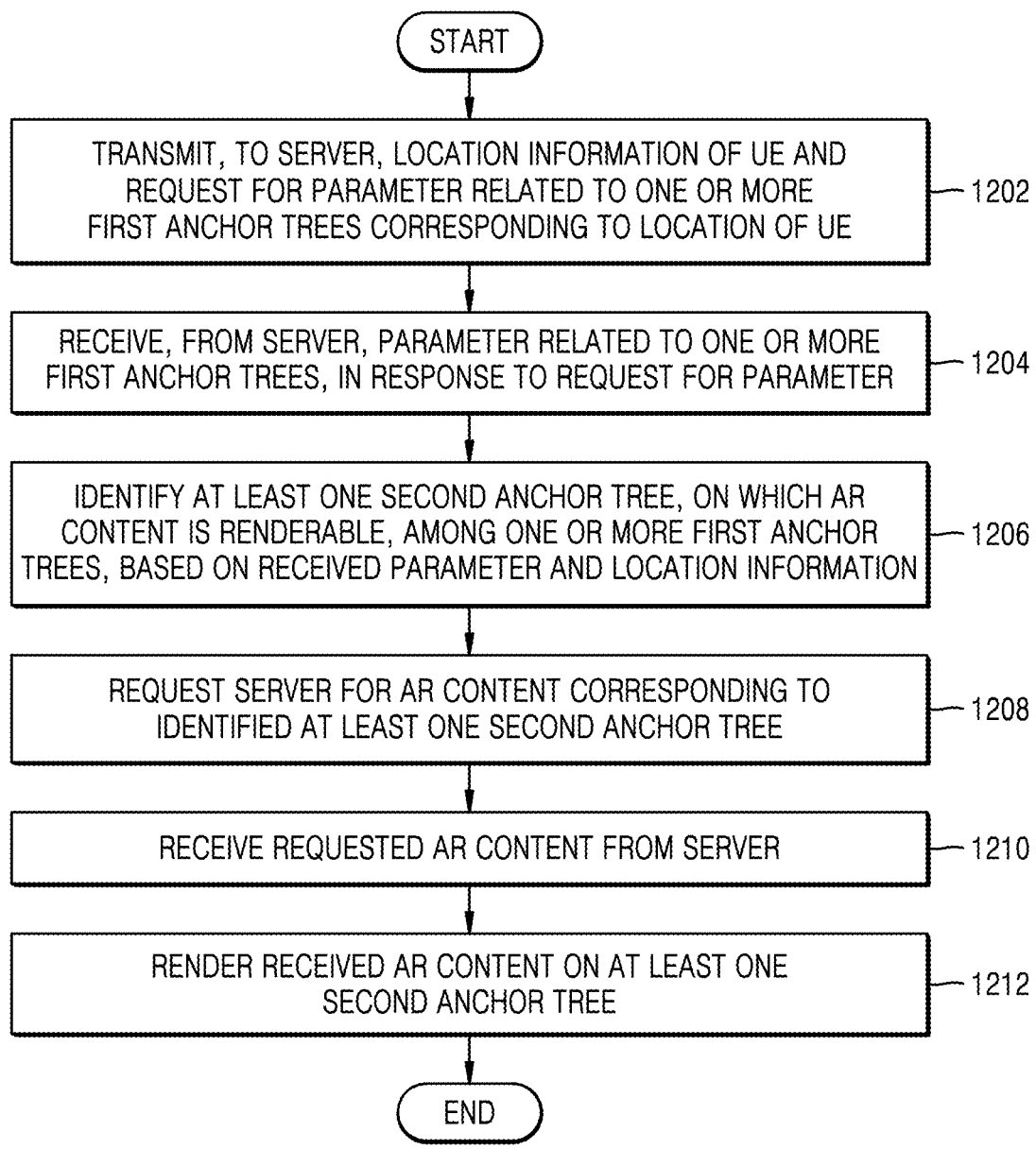
FIG. 12 is a flowchart of an operating method of a UE according to an embodiment of the disclosure.

FIG. 12 is a flowchart of an operating method of a UE according to an embodiment of the disclosure.

Referring to FIG. 12, in operation 1202, the UE may transmit, to a server, location information of the UE and a message for requesting a parameter related to one or more first anchor trees corresponding to a location of the UE. For example, the UE may identify the location of the UE through a GPS or the like and may transmit, to the server, information about the identified location of the UE.

In operation 1204, the UE may receive, from the server, the parameter related to the one or more first anchor trees, in response to the message for requesting the parameter. For example, the UE may request the server to transmit an anchor tree media list, and the server may transmit the anchor tree media list to the UE, in response to the request from the UE. The anchor tree media list may include a list of anchor trees included in an area in which the UE is located and may include parameters for each of the anchor trees described with reference to Table 1.

In operation 1206, the UE may identify at least one second anchor tree, on which AR content is renderable, among the one or more first anchor trees, based on the received parameters and the location information.

For example, the UE may determine a distance between the UE and each of the first anchor trees based on a first parameter indicating a location of each of the first anchor trees included in the received parameters. The UE may identify anchor trees among the first anchor trees, whose distance from the UE is included in a renderable range, as second anchor trees. The UE may determine the renderable range based on a second parameter indicating a minimum rendering distance and a third parameter indicating a maximum rendering distance, which are included in the received parameters.

In operation 1208, the UE may request the server for AR content corresponding to the identified at least one second anchor tree.

In detail, the UE may identify a distance range or orientation range for the at least one second anchor tree corresponding to the location of the UE, based on at least one of a fourth parameter indicating a distance range corresponding to a type of AR content to be rendered on an anchor tree or a fifth parameter indicating an orientation range corresponding to the type of AR content to be rendered on the anchor tree.

The UE may identify an AR object or AR anchoring group corresponding to the identified distance range or orientation range, based on at least one of a sixth parameter associated with an AR object included in the AR content or a seventh parameter associated with an AR anchoring group that is a set of AR objects. The UE may identify a rendering anchor based on an eighth parameter associated with a rendering anchor indicating a reference location at which the AR content is rendered.

The UE may request the AR content from the server through an AR object identifier for the identified AR object or an AR anchoring group identifier for the identified AR anchoring group.

The UE may request the AR content from the server via a rendering anchor identifier for the identified rendering anchor.

The UE may receive, from the server, reference information for matching with viewpoint information of the UE. The UE may request the AR content from the server when the viewpoint information of the UE matches the received reference information.

In operation 1210, the UE may receive, from the server, information about the requested AR content. For example, the UE may receive at least one of anchor groups, anchor objects, or rendering anchors and may receive metadata or the like required for rendering from the server.

In operation 1212, the UE may render the AR content associated with each of the identified second anchor trees based on the received information about the AR content.

Figure 13:
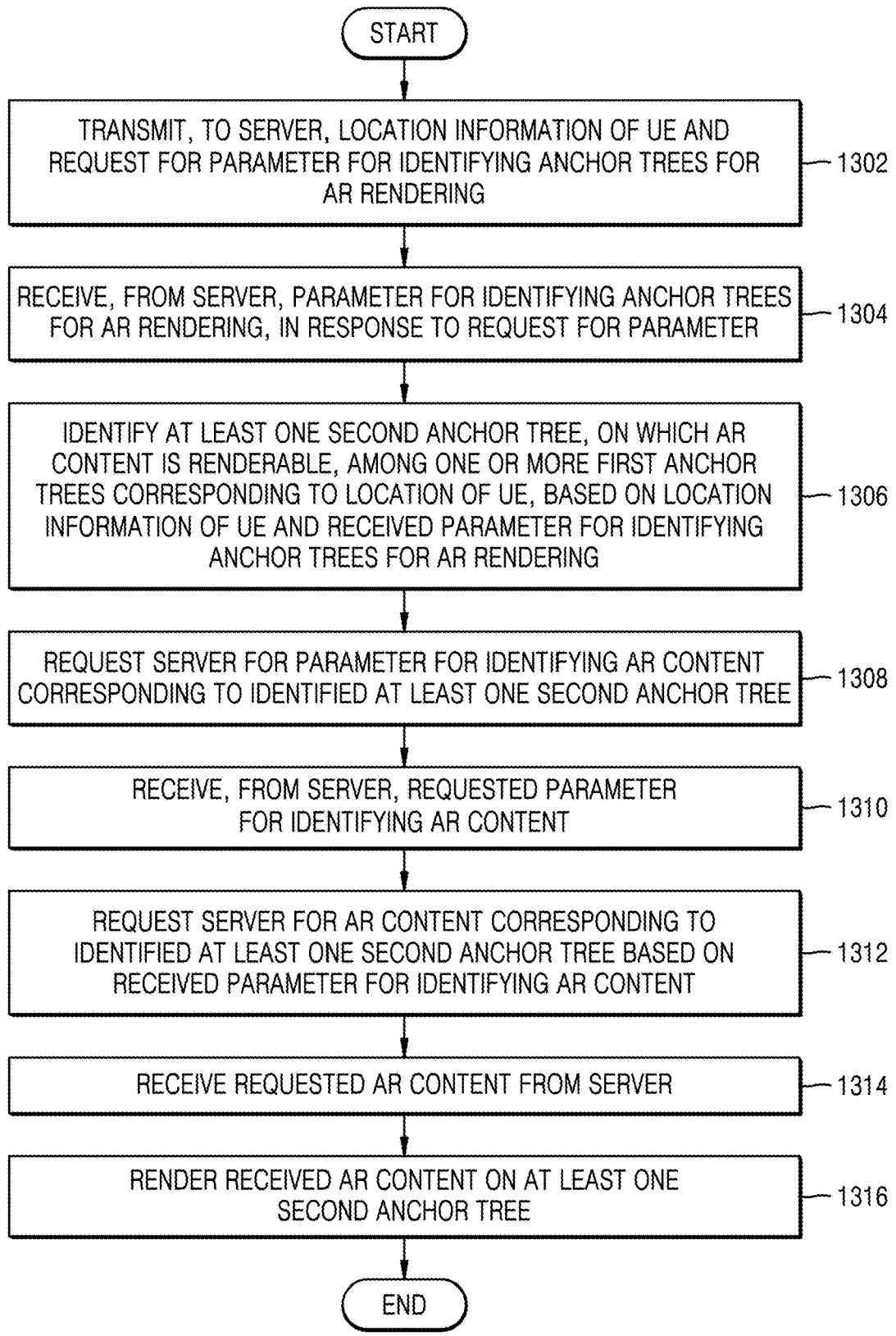
FIG. 13 is a flowchart of an operating method of a UE according to an embodiment of the disclosure.

FIG. 13 is a flowchart of an operating method of a UE according to an embodiment of the disclosure.

Referring to FIG. 13, in operation 1302, the UE may transmit, to a server, location information of the UE and a message for requesting a parameter for identifying anchor trees for AR rendering. For example, the UE may identify a location of the UE through a GPS or the like and may transmit, to the server, information about the identified location of the UE.

In operation 1304, the UE may receive, from the server, the parameter for identifying the anchor trees for the AR rendering, in response to the message for requesting the parameter. Compared to the embodiment described above with reference to FIG. 12, in operation 1304, the UE may not receive all parameters for each of first anchor trees from the server, but may receive only information required to identify second anchor trees included in a renderable range.

In operation 1306, the UE may identify at least one second anchor tree, on which AR content is renderable, among one or more first anchor trees corresponding to the location of the UE, based on the location information of the UE and the received parameter for identifying the anchor trees for the AR rendering.

For example, the parameters related to the one or more first anchor trees may include a first parameter indicating a location of each of the one or more first anchor trees and a second parameter associated with renderable range information. The renderable range information may be determined based on a third parameter indicating a minimum renderable distance and a fourth parameter indicating a maximum renderable distance.

In detail, the UE may identify, as the at least one second anchor tree, at least one anchor tree whose distance from the UE corresponds to the renderable range information, among the one or more first anchor trees, based on the first parameter and the second parameter.

In operation 1308, the UE may request the server for a parameter for identifying AR content corresponding to the identified at least one second anchor tree.

In operation 1310, the UE may receive, from the server, the requested parameter for identifying the AR content.

For example, the parameter for identifying the AR content corresponding to the received at least one second anchor tree may include at least one of a fifth parameter indicating a distance range corresponding to a type of the AR content to be rendered on an anchor tree, a sixth parameter indicating an orientation range corresponding to the type of the AR content to be rendered on the anchor tree, a seventh parameter associated with an AR object included in the AR content, or an eighth parameter associated with an AR anchoring group that is a set of AR objects.

For example, the UE may only receive parameters related to second anchor trees from the server, and the parameters may correspond to the parameters described above with reference to Table 1. However, the first parameter and the second parameter received in operation 1304, among the parameters described with reference to Table 1, may be excluded from the parameters received in operation 1308.

In operation 1312, the UE may request the server for the AR content corresponding to the identified at least one second anchor tree based on the received parameter for identifying the AR content.

The UE may identify a distance range or orientation range for the at least one second anchor tree corresponding to the location of the UE, based on at least one of the fifth parameter or the sixth parameter.

The UE may identify an AR object or AR anchoring group corresponding to the identified distance range or orientation range, based on at least one of the seventh parameter or the eighth parameter.

The UE may identify a rendering anchor indicating a reference location at which the AR content is rendered, based on the eighth parameter.

According to an embodiment, the UE may receive, from the server, reference information for matching with an appearance of the second anchor trees viewed from the UE. When the appearance of the second anchor trees viewed from the UE matches the received reference information, the UE may request the server for information about the AR content associated with each of the second anchor trees.

For example, the UE may transmit, to the server, an AR object identifier corresponding to the identified AR content based on the seventh parameter indicating the AR object included in the received parameters. Alternatively, the UE may transmit, to the server, an anchoring group identifier corresponding to the identified AR content based on the eighth parameter indicating the anchoring group included in the received parameters. Alternatively, the UE may transmit, to the server, a rendering anchor identifier corresponding to the identified AR content based on a ninth parameter indicating a rendering anchor included in the received parameters.

In operation 1314, the UE may receive, from the server, information about the requested AR content. For example, the UE may receive at least one of anchor groups, anchor objects, or rendering anchors and may receive metadata or the like required for rendering from the server.

In operation 1316, the UE may render the AR content associated with each of the identified second anchor trees based on the received information about the AR content.

Figure 14:
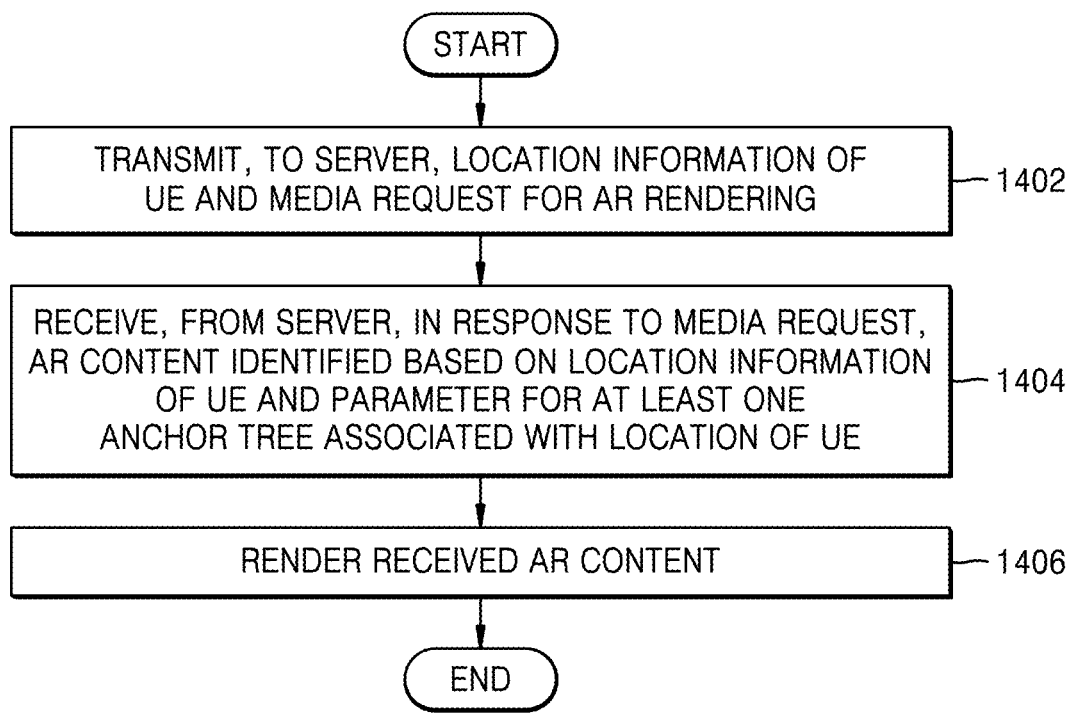
FIG. 14 is a flowchart of an operating method of a UE according to an embodiment of the disclosure.

FIG. 14 is a flowchart of an operating method of a UE according to an embodiment of the disclosure.

Referring to FIG. 14, in operation 1402, the UE may transmit, to a server, information about a location of the UE and a message for requesting media. For example, the UE may identify the location of the UE through a GPS or the like and may transmit, to the server, information about the identified location of the UE.

In operation 1404, the UE may receive, from the server, in response to the message for requesting media, information about AR content that is identified by the server based on the location of the UE and a parameter for each of the one or more anchor trees associated with the location of the UE.

According to an embodiment of the disclosure, the UE may transmit the information about the location of the UE to the server, and the server may identify information required for the UE to render based on the received information about the location of the UE. For example, the server may identify second anchor trees, which are renderable anchor trees, among first anchor trees corresponding to the location of the UE. The server may identify AR content for the second anchor trees based on parameters stored in the server. For example, the server may identify the AR content based on a distance between the UE and the server and an orientation of the UE with respect to the server. Unlike the embodiments described above with reference to FIGS. 12 and 13, in the case of the embodiment according to FIG. 14, because the server identifies information required for rendering and transmits the identified information to the UE, the server may bear overhead for an operation performed by the UE to identify AR content.

In operation 1406, the UE may render the identified AR content based on the received information about the AR content. For example, the UE may receive, from the server, reference information for matching with an appearance of the second anchor trees viewed through the UE and, when the reference information matches the appearance of the second anchor trees viewed through the UE, may perform rendering on the AR content.

In the aforementioned embodiments, an operation in which the UE identifies an object to be rendered based on information about AR content and an environment of the UE, requests the identified object from the server, and receives and renders the object has been described. In another embodiment of the disclosure, the UE may receive the entire AR content, and may decode and render the object to be rendered based on the received information on the AR content and the environment of the UE, and in this case, in the operation of the UE, a process of requesting the server in the aforementioned embodiment is only replaced with a process of accessing only a necessary portion of the received AR content.

The methods according to the embodiments of the disclosure described in claims or specification thereof may be implemented in hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs may include instructions that cause the electronic device to execute the methods according to the embodiments of the disclosure described in the claims or specification thereof. Also, a computer program product storing the one or more programs may be provided.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. Also, there may be a plurality of memories.

Furthermore, the programs may be stored in an attachable storage device that may be accessed through communication networks such as the Internet, Intranet, a local area network (LAN), a wide LAN (WLAN), or a storage area network (SAN) or a communication network configured in a combination thereof. The storage device may access an apparatus performing the embodiments of the disclosure through an external port. Also, a separate storage device on a communication network may be connected to the apparatus performing the embodiments of the disclosure.

In the embodiments of the disclosure, a component included in the disclosure is expressed in a singular or plural form depending on the described embodiments of the disclosure. However, singular or plural expressions have been selected properly for a condition provided for convenience of a description, and the disclosure is not limited to singular or plural components, and components expressed as plural may be configured as a single component or a component expressed as singular may also be configured as plural components.

The embodiments of the disclosure disclosed in the specification and the accompanying drawings have been provided only as specific examples in order to easily describe technical features in the disclosure and assist in understanding the disclosure and are not intended to limit the scope of the disclosure. In other words, it is obvious to a person skilled in the art to which the disclosure pertains that other modified examples based on the technical concept of the disclosure are possible. Furthermore, the respective embodiments may be used by being combined with each other, as necessary. For example, an embodiment of the disclosure may be combined with parts of other embodiments of the disclosure to operate a UE and a server. Furthermore, the embodiments of the disclosure may be applicable to other communication systems, and other modified examples based on the technical concept of the disclosure may also be possible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   transmitting, to a server, location information of the UE and a message for requesting a parameter related to one or more first anchor trees corresponding to a location of the UE;
   in response to the message for requesting the parameter, receiving, from the server, the parameter related to the one or more first anchor trees;

based on the received parameter and the location information, identifying at least one second anchor tree, on which an augmented reality (AR) content is renderable, among the one or more first anchor trees;

requesting the server for an AR content corresponding to the identified at least one second anchor tree;

receiving the requested AR content from the server; and rendering the received AR content on the at least one second anchor tree.

2. The method of claim 1, wherein the identifying of the at least one second anchor tree comprises identifying, as the at least one second anchor tree, at least one anchor tree whose distance from the UE corresponds to renderable range information, among the one or more first anchor trees, based on a first parameter indicating a location of each of the one or more first anchor trees.

3. The method of claim 2, wherein the renderable range information is determined based on a second parameter indicating a minimum renderable distance and a third parameter indicating a maximum renderable distance.

4. The method of claim 1, wherein the requesting of the server for the AR content comprises identifying a distance range or an orientation range for the at least one second anchor tree corresponding to the location of the UE, based on at least one of a fourth parameter indicating a distance range corresponding to a type of AR content to be rendered on an anchor tree or a fifth parameter indicating an orientation range corresponding to the type of AR content to be rendered on the anchor tree.

5. The method of claim 4, wherein the requesting of the server for the AR content further comprises identifying an AR object or an AR anchoring group corresponding to the identified distance range or orientation range, based on at least one of a sixth parameter associated with an AR object included in the AR content or a seventh parameter associated with an AR anchoring group that is a set of AR objects.

6. The method of claim 5, wherein the requesting of the server for the AR content further comprises requesting the server for the AR content via an AR object identifier for the identified AR object or an AR anchoring group identifier for the identified AR anchoring group.

7. The method of claim 1, wherein the requesting of the server for the AR content comprises identifying a rendering anchor based on an eighth parameter associated with a rendering anchor indicating a reference location at which the AR content is rendered.

8. The method of claim 7, wherein the requesting of the server for the AR content further comprises requesting the server for the AR content via a rendering anchor identifier for the identified rendering anchor.

9. The method of claim 1, wherein the requesting of the server for the AR content comprises:

receiving, from the server, reference information for matching with viewpoint information of the UE; and when the viewpoint information of the UE matches the received reference information, requesting the server for the AR content.

10. A method performed by a user equipment (UE) in a wireless communication system, the method comprising:

transmitting, to a server, location information of the UE and a message for requesting a parameter for identifying anchor trees for an augmented reality (AR) rendering;

in response to the message for requesting the parameter, receiving, from the server, the parameter for identifying the anchor trees for the AR rendering;

identifying at least one second anchor tree, on which an AR content is renderable, among one or more first anchor trees corresponding to the location of the UE, based on the location information of the UE and the received parameter for identifying the anchor trees for the AR rendering;

requesting the server for a parameter for identifying an AR content corresponding to the identified at least one second anchor tree;

receiving, from the server, the requested parameter for identifying the AR content;

requesting the server for the AR content corresponding to the identified at least one second anchor tree based on the received parameter for identifying the AR content;

receiving the requested AR content from the server; and rendering the received AR content on the at least one second anchor tree.

11. The method of claim 10, wherein a parameter related to the one or more first anchor trees comprises a first parameter indicating a location of each of the one or more first anchor trees and a second parameter associated with renderable range information.

12. The method of claim 11, wherein the renderable range information is determined based on a third parameter indicating a minimum renderable distance and a fourth parameter indicating a maximum renderable distance.

13. The method of claim 11, wherein the identifying of the at least one second anchor tree comprises identifying, as the at least one second anchor tree, at least one anchor tree whose distance from the UE corresponds to the renderable range information, among the one or more first anchor trees, based on the first parameter and the second parameter.

14. The method of claim 10, wherein the received parameter for identifying the AR content corresponding to the at least one second anchor tree comprises at least one of a fifth parameter indicating a distance range corresponding to a type of AR content to be rendered on an anchor tree, a sixth parameter indicating an orientation range corresponding to the type of the AR content to be rendered on the anchor tree, a seventh parameter associated with an AR object included in the AR content, or an eighth parameter associated with an AR anchoring group that is a set of AR objects.

15. The method of claim 14, wherein the requesting of the server for the AR content comprises identifying a distance range or an orientation range for the at least one second anchor tree corresponding to the location of the UE, based on at least one of the fifth parameter or the sixth parameter.

16. The method of claim 15, wherein the requesting of the server for the AR content further comprises identifying an AR object or an AR anchoring group corresponding to the identified distance range or orientation range, based on at least one of the seventh parameter or the eighth parameter.

17. The method of claim 14, wherein the requesting of the server for the AR content comprises identifying a rendering anchor indicating a reference location at which the AR content is rendered, based on the eighth parameter.

18. A method performed by a user equipment (UE) in a wireless communication system, the method comprising:

transmitting, to a server, location information of the UE and a media request for augmented reality (AR) rendering;

in response to the media request, receiving, from the server, an AR content that is identified by the server based on the location information of the UE and a parameter for at least one anchor tree associated with a location of the UE; and rendering the received AR content.

19. A user equipment (UE) in a wireless communication system, the UE comprising:
a transceiver; and
at least one processor configured to:
transmit, to a server via the transceiver, location information of the UE and a message for requesting a parameter related to one or more first anchor trees corresponding to a location of the UE,
in response to the message for requesting the parameter, receive, from the server, the parameter related to the one or more first anchor trees,
based on the received parameter and the location information, identify at least one second anchor tree, on which an augmented reality (AR) content is renderable, among the one or more first anchor trees,
request, via the transceiver, the server for an AR content corresponding to the identified at least one second anchor tree,
receive, via the transceiver, the requested AR content from the server, and
render the received AR content on the at least one second anchor tree.

20. The UE of claim 19, wherein the received parameter comprises at least one of a first parameter indicating a location of each of the one or more first anchor trees, a second parameter indicating a minimum renderable distance, a third parameter indicating a maximum renderable distance, a fourth parameter indicating a distance range corresponding to a type of AR content to be rendered on an anchor tree, a fifth parameter indicating an orientation range corresponding to the type of AR content to be rendered on the anchor tree, a sixth parameter associated with an AR object included in the AR content, a seventh parameter associated with an AR anchoring group that is a set of AR objects, or an eighth parameter associated with a rendering anchor indicating a reference location at which the AR content is rendered.

* * * * *